(12) United States Patent
Fan et al.

(10) Patent No.: US 12,170,479 B2
(45) Date of Patent: Dec. 17, 2024

(54) POWER MANAGEMENT SYSTEM AND ELECTRONIC DEVICE

(71) Applicant: HUAWEI TECHNOLOGIES CO., LTD., GuangDong (CN)

(72) Inventors: Tuanbao Fan, Shanghai (CN); Ningbo Sun, Shanghai (CN); Xiaoshan Shi, Shanghai (CN); Yi Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 17/951,469

(22) Filed: Sep. 23, 2022

(65) Prior Publication Data

US 2023/0015278 A1 Jan. 19, 2023

Related U.S. Application Data

(63) Continuation of application No. PCT/CN2020/080732, filed on Mar. 23, 2020.

(51) Int. Cl.
*H02M 3/156* (2006.01)
*G06F 1/26* (2006.01)
(Continued)

(52) U.S. Cl.
CPC ............ *H02M 3/1566* (2021.05); *G06F 1/26* (2013.01); *G06F 1/266* (2013.01);
(Continued)

(58) Field of Classification Search
CPC ... G06F 1/26; G06F 1/266; G06F 1/28; G06F 1/30; H02M 3/07; H02M 3/135;
(Continued)

(56) References Cited

U.S. PATENT DOCUMENTS 5,889,392 A * 3/1999 Moore ................ H02M 3/1588
363/17
7,602,155 B2 * 10/2009 Markowski ........... H03F 3/2178
323/284
(Continued)

FOREIGN PATENT DOCUMENTS

CN 102857101 A 1/2013
CN 105723600 A 6/2016
(Continued)

*Primary Examiner* — Thomas J. Cleary
(74) *Attorney, Agent, or Firm* — Rimon PC

(57) ABSTRACT

A power management system includes a direct current-direct current DC-DC conversion circuit, a first control circuit, a charging circuit, an input port, and an output port. The input port is configured to receive an input voltage. The output port is configured to supply an output voltage to a load. The DC-DC conversion circuit is configured to charge the output port from the input port, to adjust the output voltage. The first control circuit is configured to: obtain a second feedback voltage of the output voltage from the output port, generate a first control signal based on the second feedback voltage and a second reference signal, and supply the first control signal to the charging circuit. The charging circuit charges the output port from the input port based on the first control signal, to supplementally adjust the output voltage.

17 Claims, 10 Drawing Sheets

(51) Int. Cl.
  *H02J 7/00* (2006.01)
  *H02M 3/158* (2006.01)
(52) U.S. Cl.
  CPC ......... *H02J 7/00712* (2020.01); *H02M 3/156* (2013.01); *H02M 3/1584* (2013.01)
(58) Field of Classification Search
  CPC ...... H02M 3/137; H02M 3/139; H02M 3/156; H02M 3/1566; H02M 3/157; H02M 3/158; H02M 3/285; H02M 3/1584; H02J 7/00712; Y02D 10/00
  See application file for complete search history.

(56) References Cited

U.S. PATENT DOCUMENTS

| | | | |
|---|---|---|---|
| 7,948,720 B2 | 5/2011 | Mok et al. | |
| 9,413,240 B2 | 8/2016 | Mansri et al. | |
| 9,577,532 B2 | 2/2017 | Tournatory et al. | |
| 10,298,114 B1 * | 5/2019 | Yazdi | H02M 1/15 |
| 10,581,330 B2 | 3/2020 | Lee et al. | |
| 10,763,840 B1 * | 9/2020 | Tan | H03K 3/3565 |
| 2004/0004470 A1 * | 1/2004 | Yoshida | H02M 3/3385 |
| | | | 323/284 |
| 2004/0232900 A1 * | 11/2004 | Huang | H02M 3/158 |
| | | | 323/282 |
| 2007/0096703 A1 | 5/2007 | Jain | |
| 2007/0103136 A1 | 5/2007 | Jain | |
| 2009/0237854 A1 * | 9/2009 | Mok | H02M 3/156 |
| | | | 361/111 |
| 2010/0302615 A1 * | 12/2010 | Aubert | G02B 26/005 |
| | | | 359/290 |
| 2013/0162233 A1 * | 6/2013 | Marty | H02M 3/158 |
| | | | 323/274 |
| 2013/0193941 A1 * | 8/2013 | DeFazio | G05F 1/46 |
| | | | 323/282 |
| 2014/0232368 A1 | 8/2014 | Dally | |
| 2017/0117717 A1 * | 4/2017 | Pagano | H02J 50/10 |
| 2017/0207721 A1 * | 7/2017 | Li | H02M 3/1584 |
| 2018/0083533 A1 * | 3/2018 | Price | H02M 3/158 |
| 2019/0158072 A1 * | 5/2019 | Tornila Oliver | H03K 3/011 |
| 2019/0259822 A1 * | 8/2019 | Jeon | H01L 29/78603 |
| 2019/0280590 A1 * | 9/2019 | Lee | H02M 3/156 |
| 2023/0188037 A1 * | 6/2023 | Priego | H02M 3/156 |
| | | | 323/272 |

FOREIGN PATENT DOCUMENTS

| | | |
|---|---|---|
| CN | 106992680 A | 7/2017 |
| CN | 108432114 A | 8/2018 |

\* cited by examiner

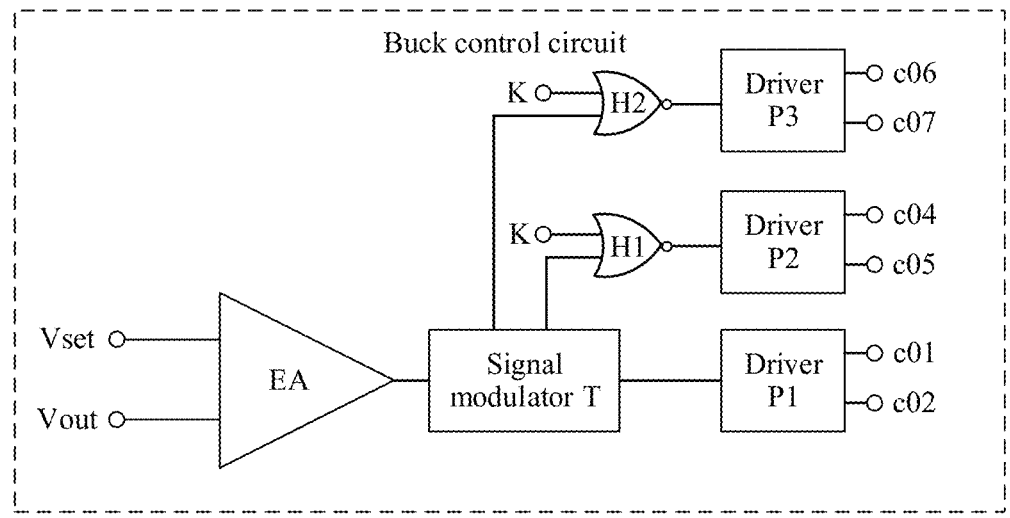

A DC-DC conversion circuit is configured to: obtain a first feedback voltage used to reflect an output voltage from an output port, and charge the output port from an input port based on the first feedback voltage and a first reference signal, to adjust the output voltage — 1301

A first control circuit is configured to: obtain a second feedback voltage of the output voltage from the output port, generate a first control signal based on the second feedback voltage and a second reference signal, and supply the first control signal to a charging circuit — 1302

The charging circuit charges the output port from the input port based on the first control signal, to supplementally adjust the output voltage — 1303

FIG. 13

POWER MANAGEMENT SYSTEM AND ELECTRONIC DEVICE

CROSS-REFERENCE TO RELATED APPLICATIONS

This application is a continuation of International Application No. PCT/CN2020/080732, filed on Mar. 23, 2020, the disclosure of which is hereby incorporated by reference in its entirety.

TECHNICAL FIELD

Embodiments of this application relate to the field of circuit technologies, and in particular, to a power management system and an electronic device.

BACKGROUND

The continued development of electronic technologies has lead to increasingly improved performance of electronic devices, and a diversity of functional applications have been provided to users. The running rate of a component, such as a processor, that is configured to drive an electronic device to implement these various functions is increasingly high. An increase in the running rate of the component such as the processor causes increasing power consumption by the electronic device. To reduce the power consumption of the electronic device, a power management system needs to dynamically adjust an output voltage of the power management system in real time based on the power consumption of a load such as a processor. Especially, when the output voltage transiently drops below a voltage required by the load due to a sharp increase in the power consumption of the load, the power management system needs to quickly respond, so that the output voltage is stabilized within a voltage range required by the load, to avoid an abnormal power failure of the load.

In a conventional technology, when an output voltage transiently drops, it usually takes a long time to adjust the output voltage back to a voltage range required by the load. FIG. 7(b) shows a waveform of the output voltage in the conventional technology. Ideally, the output voltage of the power management system is stabilized within a range of VT to VB. In the conventional technology, when an output voltage of an output port Vout drops below a threshold voltage VB, the power management system needs a long response time (for example, 2 μs) to adjust the output voltage of the output port Vout back to the threshold voltage VB. In addition, the longer response time results in a larger drop of the output voltage and a longer adjustment time.

In conclusion, in a solution of dynamically adjusting the output voltage in the conventional technology, when the output voltage transiently drops below the voltage required by the load, it usually takes a long time to adjust the output voltage back to a stable voltage range. This affects the stability of the output voltage, and further affects the working stability of the load.

SUMMARY

This application provides a power management system. The power management system can quickly respond to a load to supply power to the load when power consumption of the load sharply increases while ensuring power utilization. This helps improve the stability of an electronic device and prolong the battery life of the electronic device.

To achieve the foregoing objective, this application uses the following technical solutions.

According to a first aspect, an embodiment of this application provides a power management system. The power management system includes a direct current-direct current DC-DC conversion circuit, a first control circuit, a charging circuit, an input port, and an output port. The input port is configured to receive an input voltage. The output port is connected to a load, and is configured to supply an output voltage to the load. The DC-DC conversion circuit is connected between the input port and the output port, and is configured to: obtain a first feedback voltage used to reflect the output voltage from the output port, and charge the output port from the input port based on the first feedback voltage and a first reference signal, to adjust the output voltage. The first control circuit is connected between the output port and the charging circuit, and is configured to: obtain a second feedback voltage of the output voltage from the output port, generate a first control signal based on the second feedback voltage and a second reference signal, and supply the first control signal to the charging circuit. The charging circuit is connected between the input port and the output port, and is configured to charge the output port from the input port based on the first control signal, to supplementally adjust the output voltage.

In this implementation, for example, the charging circuit may be a charging subcircuit (not shown in the figure) in a charging circuit 02 shown in FIG. 1, that is, may be a circuit other than a hysteresis comparator in the charging circuit 02 in any one of embodiments shown in FIG. 2 and FIG. 5, or may include a circuit including a transistor Q4 and an inductor L1 in an embodiment shown in FIG. 8, or may include a circuit including a transistor Q4, an inductor L1, a transistor Q6, and an inductor L2 in an embodiment shown in FIG. 11. For example, the first reference signal may be a reference signal Vset shown in FIG. 2.

In this implementation, the DC-DC conversion circuit 01 dynamically adjusts a voltage and a current that are supplied by the input port, to generate a voltage and a current required by the load to operate, so as to output the voltage and the current to the load through the output port. When the output voltage of the output port transiently drops below a voltage required by the load, the first control circuit controls the charging circuit to supply, to the output port, electric energy input from the input port, to supplement the electric energy to the load. Therefore, a continuous voltage drop of the output port may be suppressed, so that the voltage of the output port is quickly adjusted back to an expected output voltage range. This helps improve the power supply stability of the power management system, to ensure the working stability of the load.

In a possible implementation, the first control circuit includes a comparator, configured to compare the second feedback voltage with the second reference signal to obtain the first control signal.

Specifically, the first control circuit compares the second feedback voltage with the second reference signal. When it is determined that the second feedback voltage is less than or equal to the second reference signal, the first control signal is used to control a transistor in the charging circuit to be turned on, so that the charging circuit supplies, to the output port, the electric energy supplied by the input port, to suppress a voltage drop of the output port. When the first control circuit determines that the second feedback voltage is greater than the second reference signal, the first control signal is used to control a transistor in the charging circuit to be turned off, to stop supplementing the electric energy to the output port. Therefore, the output voltage of the output port is maintained within the expected output voltage range.

In a possible implementation, the first control circuit may be a hysteresis comparator.

In a possible implementation, the second reference signal includes a plurality of threshold signals used for hysteresis comparison of the hysteresis comparator. The plurality of threshold signals may include, for example, a reference signal VT and a reference signal VB shown in FIG. 2.

In a possible implementation, the DC-DC conversion circuit includes a second control circuit and at least one first power stage circuit. The second control circuit is configured to obtain a first feedback voltage used to reflect the output voltage from the output port, and generate at least one second control signal based on the first feedback voltage and the first reference signal. Each of the at least one first power stage circuits includes a first transistor, a second transistor, and an inductor. A first terminal of the first transistor is connected to the input port. A second terminal of the first transistor is connected to a first terminal of the second transistor. A second terminal of the second transistor is connected to a common ground. One terminal of the inductor is connected to the second terminal of the first transistor, and the other terminal of the inductor is connected to the output port. The first transistor is configured to charge, based on a second control signal that corresponds to the first power stage circuit among the at least one second control signals, the output port from the input port by using the inductor. The second transistor is configured to charge, based on the second control signal that corresponds to the first power stage circuit, the output port by using the inductor.

In this implementation, the power stage circuit may include, for example, but is not limited to, a boost-buck circuit or a buck circuit. The DC-DC conversion circuit may include one power stage circuit, or may include a plurality of (for example, two or three) power stage circuits. When the DC-DC conversion circuit includes one power stage circuit, for example, as shown in FIG. 2, the first transistor may be a transistor Q1, the second transistor may be a transistor Q2, and the inductor may be an inductor L0. A control signal used to control the power stage circuit is a signal output from a control terminal c01 and a control terminal c02 of a buck control circuit. When the DC-DC conversion circuit includes two power stage circuits, for example, as shown in FIG. 8, one power stage circuit may include a transistor Q1, a transistor Q2, and an inductor L0, and the other power stage circuit may include a transistor Q4, a transistor Q5, and an inductor L1. In this case, the first transistor may include the transistor Q1 and the transistor Q4, the second transistor may include the transistor Q2 and the transistor Q5, and the inductor may include the inductor L0 and the inductor L1. When the DC-DC conversion circuit includes three power stage circuits, for example, as shown in FIG. 11, one power stage circuit may include a transistor Q1, a transistor Q2, and an inductor L0, another power stage circuit may include a transistor Q4, a transistor Q5, and an inductor L1, and the other power stage circuit may include a transistor Q6, a transistor Q7, and an inductor L2.

Based on the first aspect, in a possible implementation, the charging circuit includes a third transistor. A control terminal of the third transistor is configured to receive the first control signal, a first terminal of the third transistor is connected to the input port, and a second terminal of the third transistor is connected to the output port. The third transistor is configured to charge the output port from the input port based on the first control signal.

In this implementation, the third transistor may be, for example, a transistor Q4 shown in FIG. 2. When the third transistor is turned on, the electric energy input from the input port is supplied to the output port by using the third transistor, to increase the voltage of the output port. When the third transistor is turned off, charging of the output port is stopped.

Based on the first aspect, in a possible implementation, the charging circuit includes a third transistor, a fourth transistor, and a capacitor. A control terminal of the third transistor and a control terminal of the fourth transistor are separately configured to receive the first control signal. A first terminal of the third transistor is connected to a second terminal of the fourth transistor. A second terminal of the third transistor is connected to the output port. A first terminal of the fourth transistor is connected to the input port. A first electrode of the capacitor is connected to the first terminal of the third transistor. A second electrode of the capacitor is connected to the common ground. The fourth transistor is configured to charge the capacitor from the input port based on the first control signal. The third transistor is configured to charge the output port from the capacitor based on the first control signal.

In this implementation, the third transistor may be, for example, a transistor Q4 shown in FIG. 5. The fourth transistor may be, for example, a transistor Q3 shown in FIG. 5. The capacitor may be, for example, a capacitor C2 shown in FIG. 5.

When the third transistor is turned on and the fourth transistor is turned off, the voltage input from the output port is supplied to the capacitor to charge the capacitor. When the third transistor is turned off and the fourth transistor is turned on, the capacitor supplies a stored charge to the output port to charge the output port, so as to adjust the output voltage of the output port.

Based on the first aspect, in a possible implementation, a first transistor in a second power stage circuit in the at least one first power stage circuit is shared by the second power stage circuit and the charging circuit. The first transistor in the second power stage circuit is specifically configured to charge, based on the first control signal and a second control signal that corresponds to the second power stage circuit, the output port from the input port by using the inductor.

In this implementation, when the DC-DC conversion circuit includes a plurality of power stage circuits, a first transistor in part of the power stage circuits is shared by the power stage circuit and the charging circuit. Sharing herein means that when the voltage output from the output port is within the expected output voltage range, the first transistor in the part of the power stage circuits serves as a part of the DC-DC conversion circuit, and is controlled by the second control signal, to charge the output port. When the voltage of the output port drops below the voltage required by the load, the first transistor in the part of the power stage circuit serves as a part of the charging circuit, and is controlled by the first control signal, to charge the output port.

The second power stage circuit may include, for example, a circuit including the transistor Q4, the transistor Q5, and the inductor L1 shown in FIG. 8, and may further include a circuit including the transistor Q6, the transistor Q7, and the inductor L2 shown in FIG. 11. In this case, the shared first transistor may include the transistor Q4 and the transistor Q6 shown in FIG. 11.

Based on the first aspect, in a possible implementation, the second control circuit is further configured to: obtain the first control signal, and generate a third control signal based on the first control signal and the second control signal that corresponds to the second power stage circuit. The first transistor in the second power stage circuit is specifically configured to charge, based on the third control signal, the output port from the input port by using the inductor.

Based on the first aspect, in a possible implementation, the second control circuit includes an error amplifier, a signal modulator, and at least one driver. The error amplifier amplifies an error between the first feedback voltage and the first reference signal to obtain an amplified signal. The signal modulator is configured to receive the amplified signal and generate the at least one modulated signal. Each of the at least one drivers is configured to receive the modulated signal and generate one of the at least one second control signals.

Based on the first aspect, in a possible implementation, the power management system further includes a reference signal adjustment circuit, connected between the first control circuit and the DC-DC conversion circuit. The reference signal adjustment circuit is configured to: adjust a value of the first reference signal based on the first control signal, and supply the adjusted first reference signal to the DC-DC conversion circuit.

In some scenarios, because the charging circuit charges the load through the output port, the voltage of the output port increases. However, the voltage of the output port received by a first input terminal of the second control circuit may be a value obtained through voltage compensation. A difference between the value and the second reference signal is usually small. Therefore, the second control circuit reduces the power supply duration in a power supply period to reduce output electric energy. In this case, if the charging circuit does not continuously supply power or a remaining voltage after the capacitor discharges is insufficient to support the load, the power supply is usually insufficient.

The signal adjustment circuit is disposed to adjust the value of the first reference signal, so that when the charging circuit supplies an output current to the output port, the value of the first reference signal may be increased, to increase the difference between the first reference signal and the voltage of the output port, so as to prevent the DC-DC conversion circuit from reducing the power supply duration in the power supply period to reduce a power supply amount. When the charging circuit stops supplying the output current to the output port, it indicates that the voltage is adjusted back to an upper limit of an expected output voltage. The value of the first reference signal is reduced, to reduce the difference between the first reference signal and the voltage of the output port, so as to prevent the DC-DC conversion circuit from maintaining a large power supply amount thereby wasting electric energy.

According to a second aspect, an embodiment of this application provides an electronic device, including the power management system according to any one of the implementations of the first aspect.

According to a third aspect, an embodiment of this application provides a power management method. The power management method is applied to the power management system according to any one of the implementations of the first aspect. The power management method includes: a DC-DC conversion circuit in the power management system obtains a first feedback voltage used to reflect an output voltage from an output port, and charges the output port from an input port based on the first feedback voltage and a first reference signal, to adjust the output voltage. A first control circuit in the power management system is configured to: obtain a second feedback voltage of the output voltage from the output port, generate a first control signal based on the second feedback voltage and a second reference signal, and supply the first control signal to a charging circuit. The charging circuit in the power management system charges the output port from the input port based on the first control signal, to supplementally adjust the output voltage.

BRIEF DESCRIPTION OF DRAWINGS

To describe technical solutions in embodiments of this application more clearly, the following briefly introduces accompanying drawings for describing embodiments of this application. It is clear that the accompanying drawings in the following description show merely some embodiments of this application, and persons of ordinary skill in the art may still derive other drawings from these accompanying drawings without creative efforts.

FIG. 12 is a schematic diagram of still another internal structure of a buck control circuit according to an embodiment of this application;

FIG. 13 is a flowchart of a power management method according to an embodiment of this application.

DESCRIPTION OF EMBODIMENTS

The following clearly describes the technical solutions in embodiments of this application with reference to the accompanying drawings in embodiments of this application. It is clear that the described embodiments are some but not all of embodiments of this application. All other embodiments obtained by persons of ordinary skill in the art based on embodiments of this application without creative efforts shall fall within the protection scope of this application.

The term "first", "second", or the like mentioned in this specification does not indicate any order, quantity, or importance, but is used only for distinguishing between different components. Likewise, "a/an", "one", or the like is not intended to indicate a quantity limitation either, but is intended to indicate at least one. "Connection", "link" or the like is not limited to a physical or mechanical connection, but may include an electrical connection, whether directly or indirectly. It is equivalent to coupling or an electrical connection in a broad sense.

"Module" mentioned in this specification is usually a functional structure divided based on logic, and the "module" may be implemented only by hardware, or implemented by a combination of hardware and software. In embodiments of this application, the term "and/or" describes an association relationship between associated objects and indicates that three relationships may exist. For example, A and/or B may indicate the following three cases: Only A exists, both A and B exist, and only B exists.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "example" or the like is intended to present a relative concept in a specific manner.

To make the objectives, technical solutions, and advantages of this application clearer, the following clearly and completely describes the technical solutions in this application with reference to the accompanying drawings in this application. Obviously, the described embodiments are some but not all of embodiments of this application. All other embodiments obtained by persons of ordinary skill in the art based on embodiments of this application without creative efforts shall fall within the protection scope of this application.

Figure 1:
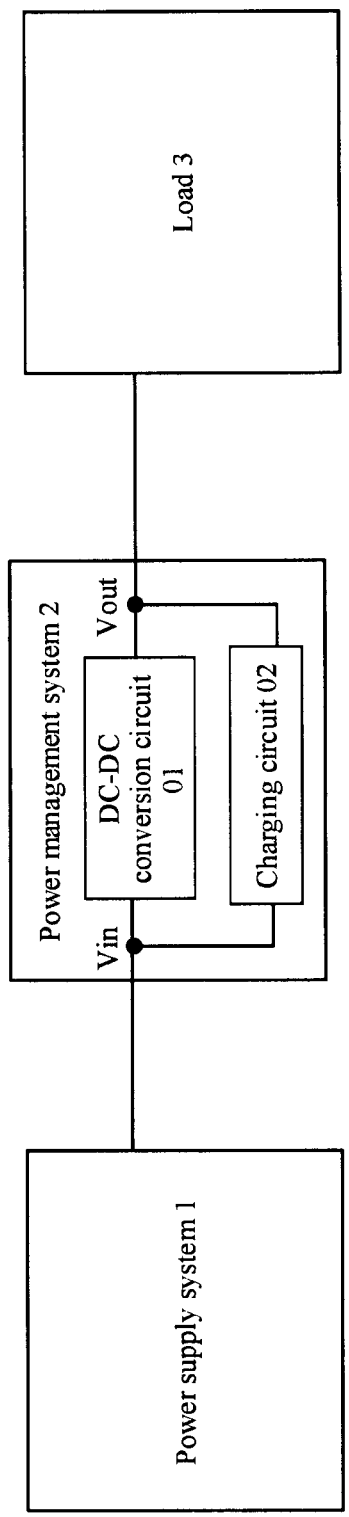
FIG. 1 is a schematic diagram of an application scenario of a power management system according to an embodiment of this application.

FIG. 1 is a schematic diagram of an application scenario of a power management system according to an embodiment of this application. In the schematic diagram of the application scenario shown in FIG. 1, a power supply system 1, a power management system 2, and a load 3 are included. The power supply system 1 is connected to an input port Vin of the power management system 2, to supply electric energy to the power management system. The power supply system 1 may be an active circuit, and generally includes a battery, an active component, and the like. The power supply system 1 may alternatively be a power supply transmission line of a power grid and an external power adapter. The power management system 2 is connected to the power supply transmission line of the power grid by using the external power adapter, so that the power grid transmits electric energy to the power management system 2 by using the power adapter. An output port Vout of the power management system 2 is connected to the load 3, and is configured to transmit the electric energy supplied by the power supply system 1 to the load 3, so as to supply the electric energy required for running the load 3. The load 3 may be various processors or another type of component, for example, a graphics processing unit (GPU), a central processing unit (CPU), an operation accelerator, or various digital circuits and analog circuits. The load 3 may alternatively be various integrated circuit chips. An integrated circuit chip includes but is not limited to an artificial intelligence chip, an image processing chip, and the like. This is not limited herein.

As shown in FIG. 1, the power management system 2 includes a direct current-direct current (DC-DC) conversion circuit 01 and a charging circuit 02.

The DC-DC conversion circuit 01 is connected to the input port Vin and the output port Vout of the power management system 2. In a working process of the load 3, the DC-DC conversion circuit 01 adjusts, based on a first feedback voltage of an electrical parameter (for example, a voltage value, a current value, or a power value) of the output port Vout and a preset first reference signal, a voltage and a current that are input to the load, to supply power to the load 3.

The first reference signal is used to control a currently expected output voltage of the output port Vout, that is, a voltage required by the load 3 to operate. The first reference signal may be the expected output voltage, or may be an adjusted voltage that is adjusted based on the expected output voltage.

The first feedback voltage may be an actual output voltage of the output port Vout, or may be a voltage obtained by adjusting the actual output voltage.

In a possible implementation, the DC-DC conversion circuit 01 may include a first control circuit and a power stage circuit. The first control circuit may be implemented by using a discrete device, or may be implemented by using a programmable device. The programmable device includes but is not limited to a programmable logic controller (PLC), a digital signal processor (DSP), a signal generator, and the like. For example, the power stage circuit includes but is not limited to a boost-buck circuit or a buck circuit. Specifically, the first control circuit may adjust, based on the electrical parameter (for example, the current value, the voltage value, or the power value) of the output port Vout and the first reference signal, a duty cycle of a transistor in the power stage circuit, to control the electric energy (for example, a voltage and a current required by the load to run) supplied to the load 3.

Similarly, the charging circuit 02 is connected to the input port Vin and the output port Vout of the power management system 2. Based on a second feedback voltage of the output voltage of the output port Vout, a second reference signal, and a third reference signal, the charging circuit 02 supplies an output current to the load through the output port Vout when the output voltage is less than the second reference signal, or stops supplying an output current to the load when the output voltage is greater than the third reference signal.

The second feedback voltage may be an actual output voltage of the output port Vout, or may be the voltage obtained by adjusting the actual output voltage.

The second reference signal and the third reference signal are used to control the currently expected output voltage of the output port Vout, that is, the voltage required by the load 3 to operate. The second reference signal and the third reference signal may be the same or may be different. When the second reference signal is different from the third reference signal, a value of the third reference signal is greater than a value of the second reference signal. Specifically, when the second reference signal is the same as the third reference signal, a voltage of the third reference signal may be the expected output voltage, or may be an adjusted voltage that is adjusted based on the expected output voltage. When the second reference signal is different from the third reference signal, the second reference signal is used to control a lower limit of the expected output voltage of the output port Vout, and the third reference signal is used to control the lower limit of the expected output voltage of the output port Vout. It should be noted that the second reference signal and/or the third reference signal may change, and the second reference signal and/or the third reference signal change/changes based on an operating status of the load 3. For example, when the load 3 is in a low power consumption state, an operating voltage of the load 3 is low, and in this case, the second reference signal is weak. When the load 3 is in a high power consumption state, an operating voltage of the load 3 is high, and in this case, the second reference signal is strong.

In a possible implementation, the charging circuit 02 includes a second control circuit and a charging subcircuit. The second control circuit may be implemented by using a discrete device, or may be implemented by using a programmable device. The programmable device includes but is not limited to a PLC, a DSP, a signal generator, and the like. When detecting that the second feedback voltage is less than the second reference signal, the second control circuit controls at least some transistors in the charging subcircuit to be turned on, so as to convert, into an output current, a current input from the input port Vin, and supply the output current to the load 3 in time through the output port Vout. When detecting that the second feedback voltage is greater than the third reference signal, the second control circuit controls at least some transistors in the charging subcircuit to be turned off, so as to stop supplying an output current to the load 3.

In a possible implementation, the second control circuit includes a comparator.

Specifically, when the second reference signal is the same as the third reference signal, the comparator may be a single-limit comparator. The single-limit comparator generally includes two input terminals, which are respectively configured to input the second reference signal (or the third reference signal) and the second feedback voltage.

When the second reference signal is different from the third reference signal, the comparator may be a double-limit comparator.

Specifically, the double-limit comparator is configured to: separately compare the second feedback voltage with the second reference signal and the third reference signal; when detecting that the second feedback voltage is less than the second reference signal, control at least some transistors in the charging subcircuit to be turned on, and charge the load 3 in time through the output port Vout; and when detecting that a voltage value of the output port Vout is greater than the third reference signal, control at least some transistors in the charging subcircuit to be turned off, so as to stop charging the load 3.

Further, the double-limit comparator may be a hysteresis comparator.

In this embodiment, when the power management system 2 normally runs, the DC-DC conversion circuit 01 dynamically adjusts a voltage and a current that are supplied by the input port Vin, to generate a voltage and a current required by the load to operate, so as to output the voltage and the current to the load through the output port Vout. In some scenarios, for example, when power consumption of the load 3 sharply increases and supply of the output current is insufficient, the output voltage of the output port Vout transiently drops, and the voltage usually drops below the voltage required by the load 3 to run. In this case, the charging circuit 02 obtains an input current from the input port Vin, converts the input current into an output current, and charges the load 3 in time. In other words, in this case, the charging circuit 02 supplies the output current to the load 3 in advance, and after the DC-DC conversion circuit 01 responds, the charging circuit 02 and the DC-DC conversion circuit 01 supply the output current to the load 3 in parallel at the same time. Therefore, the time to restore the output voltage may be more rapid. This helps improve the power supply stability of the power management system, to ensure the working stability of the load.

With reference to FIG. 2 to FIG. 12, the following describes in detail a structure and a working principle of the power management system 2 shown in FIG. 1 by using an example in which a power stage circuit in a DC-DC conversion circuit 01 is a buck circuit and a first control circuit in the DC-DC conversion circuit 01 is a buck control circuit and an example in which the second control circuit in the charging circuit 02 is a hysteresis comparator. It should be noted that, in the following embodiments, a power supply port Vcc is also the input port Vin shown in FIG. 1, and is connected to an output end of the power supply system 1. To make descriptions of the following embodiments clearer, in FIG. 2 to FIG. 12, the power supply port (that is, the input port Vin shown in FIG. 1) is represented by a reference numeral Vcc.

Figure 2:
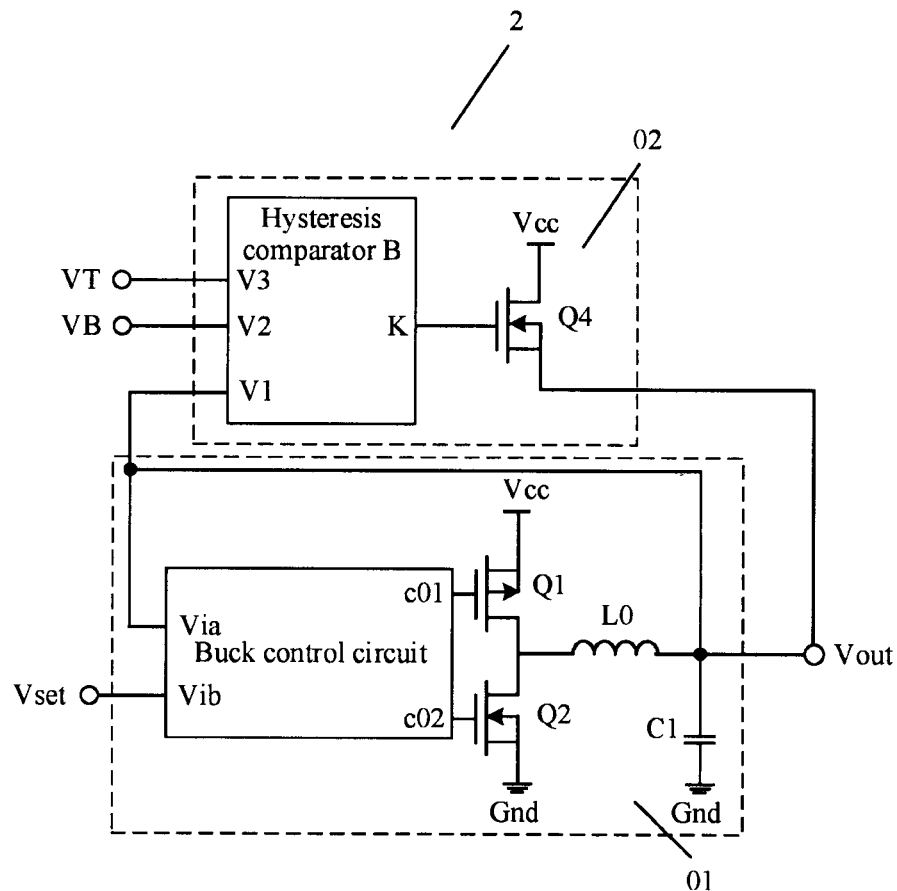
FIG. 2 is a schematic diagram of a structure of a power management system according to an embodiment of this application.

For the power management system 2 in FIG. 1, FIG. 2 is a schematic diagram of a structure of a power management system according to an embodiment of this application. As shown in FIG. 2, the power management system 2 includes a buck control circuit, a transistor Q1, a transistor Q2, an inductor L0, a capacitor C1, a charging circuit 02, the power supply port Vcc, and an output port Vout. The transistor Q1, the transistor Q2, the inductor L0, and the capacitor C1 operate as a one-phase buck circuit.

Specifically, a control terminal of the transistor Q1 and a control terminal of the transistor Q2 are respectively connected to an output terminal c01 and an output terminal c02 of the buck control circuit. A first terminal of the transistor Q1 is connected to the power supply port Vcc. A second terminal of the transistor Q2 is connected to a common ground Gnd. One terminal of the inductor L0 is connected to a second terminal of the transistor Q1 and a first terminal of the transistor Q2, and the other terminal of the inductor L0 is connected to the output port Vout. A first electrode of the capacitor C1 is connected to the output port Vout, and a second electrode of the capacitor C1 is connected to the common ground Gnd. An input terminal Via of the buck control circuit is connected to the output port Vout, and an input terminal Vib of the buck control circuit is configured to input a reference signal Vset. Herein, the reference signal Vset is used to control an expected output voltage signal of the output port Vout. When a feedback value of a voltage value of the output port Vout is less than the reference signal Vset, it indicates that power supply is insufficient, and more electric energy needs to be supplied to a load 3. When a feedback value of a voltage value of the output port Vout is greater than the reference signal Vset, it indicates that power supply is excessive, and electric energy supplied to the load 3 needs to be reduced. The feedback value may be equal to the voltage value of the output port Vout or may be another voltage value reflecting the voltage value of the output port Vout, for example, a divided voltage value of the voltage value of the output port Vout. This is not limited in this embodiment. It should be noted that the reference signal Vset may change, and the reference signal Vset changes based on a current operating status of the load and a required voltage. It should be noted herein that the transistor Q1 and the transistor Q2 have different turn-on times. To be specific, when the transistor Q1 is turned on, the transistor Q2 is turned off; and when the transistor Q1 is turned off, the transistor Q2 is turned on. The transistor Q1 and the transistor Q2 may be NMOS transistors, or may be PMOS transistors. Generally, the transistor Q1 is a PMOS transistor, and the transistor Q2 is an NMOS transistor. When the transistor Q1 and the transistor Q2 are transistors of a same type, an inverter is disposed between the output terminal c02 and the transistor Q2, and is configured to perform phase inversion on a drive signal. The inductor L0 may be a large-capacity inductor, for example, a capacity of the inductor may be 470 nH.

The buck control circuit may obtain the feedback value of the voltage value of the output port Vout in real time, and control a turn-on time of the transistor Q1 and a turn-on time of the transistor Q2 based on a difference between the obtained feedback value and the reference signal Vset, to control electric energy supplied by the power supply port Vcc to the load. For example, when the feedback value is less than a reference voltage value, and a difference between the feedback value and the reference voltage value is greater than a preset threshold, the transistor Q1 may be controlled to be fully turned on in a power supply period, and the transistor Q2 may be controlled to be fully turned off in the power supply period. For another example, when the feedback value is less than the reference voltage value, but a difference between the feedback value and the reference voltage value does not reach a preset threshold, the turn-on time of the transistor Q1 and the turn-on time of the transistor Q2 may be controlled to be respectively 50% of a power supply period. The following uses an example in which the feedback value obtained by the buck control circuit is the voltage value of the output port Vout as an example for description, but is not intended for limitation.

Figure 3:
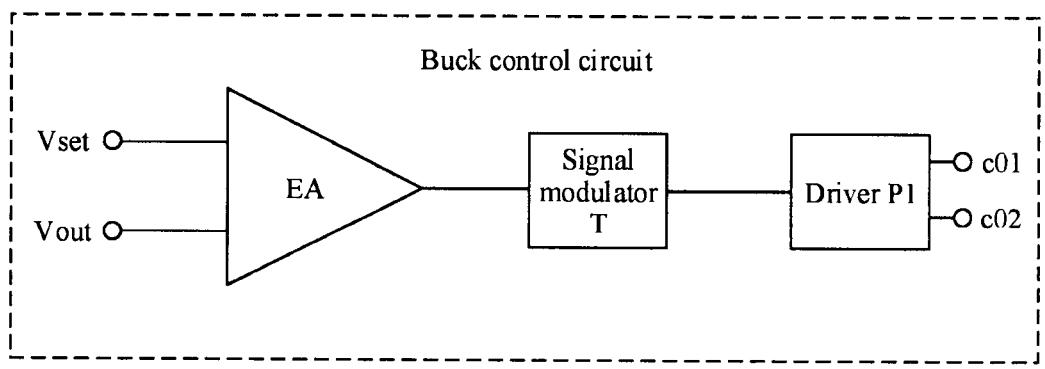
FIG. 3 is a schematic diagram of an internal structure of a buck control circuit according to an embodiment of this application.

A specific structure of the buck control circuit may be shown in FIG. 3. The buck control circuit includes an error amplifier EA, a signal modulator T, and a driver P1. One input terminal of the error amplifier EA is connected to the output port Vout, the other input terminal of the error amplifier EA is configured to input the reference signal Vset, and an output terminal of the error amplifier EA is connected to an input terminal of the signal modulator T. An output terminal of the signal modulator T is connected to an input terminal of the driver P1. The driver P1 is connected to the control terminal of the transistor Q1 through the output terminal c01. The driver P1 is connected to the control terminal of the transistor Q2 through the output terminal c02. The error amplifier EA is configured to: compare the voltage value of the output port Vout with the reference signal Vset, amplify a difference between the voltage value of the output port Vout and the reference signal Vset, and then supply an amplified difference to the signal modulator T. The signal modulator T is configured to modulate an error signal into a pulse signal, to control the transistor Q1 and the transistor Q2 to be turned on or off. The signal modulator T may be a pulse width modulator (PWM), or may be a pulse frequency modulator (PFM). When the signal modulator T is the pulse width modulator, the pulse width modulator adjusts, based on a value of the error signal, a duty cycle between a high level and a low level in a switching period to control the power supply duration. When the signal modulator T is the pulse frequency modulator, the pulse frequency modulator fixes the turn-on time of the transistor Q1 or the turn-on time of the transistor Q2 to adjust the duration of a switching period based on a value of the error signal, so as to control the power supply duration. The driver P1 is configured to perform processing such as increasing a pulse amplitude and optimizing a pulse rising edge and a pulse falling edge (for example, reducing pulse rising time and pulse falling time to quickly turn on and off a transistor) on a signal input by the signal modulator T, to generate a drive signal, so as to control the transistor Q1 and the transistor Q2 to be turned on or off. It should be noted that the specific structure of the buck control circuit shown in FIG. 3 is an example, and the specific structure of the buck control circuit may be further adjusted based on a requirement of an application scenario.

Still refer to FIG. 2, the charging circuit 02 includes a hysteresis comparator B and a transistor Q4. The hysteresis comparator B shown in FIG. 2 includes three input terminals: an input terminal V1, an input terminal V2, and an input terminal V3. The input terminal V1 of the hysteresis comparator B is connected to the output port Vout. The input terminal V2 of the hysteresis comparator B is configured to input a reference signal VB. The input terminal V3 of the hysteresis comparator B is configured to input a reference signal VT. In addition, an output terminal K of the hysteresis comparator B is connected to a control terminal of the transistor Q4. A first terminal of the transistor Q4 is connected to the power supply port Vcc. A second terminal of the transistor Q4 is connected to the output port Vout.

Generally, the load runs based on a specific voltage, and an output voltage of the output port Vout needs to be stabilized within a fluctuation range of the specific voltage, to ensure stable operation of the load. The reference signal VT is used to control an upper limit of the expected output voltage signal of the output port Vout. The reference signal VB is used to control a lower limit of the expected output voltage signal of the output port Vout. A value of the reference signal VB is less than a value of the reference signal VT.

In a possible implementation, the reference signal VT and the reference signal VB may be set based on the reference signal Vset. Specifically, the reference signal VT may be a sum of the reference signal Vset and a first offset ΔV1. The reference signal VB may be a difference between a value of the reference signal Vset and a second offset ΔV2. The first offset ΔV1 and the second offset ΔV2 are preset.

In this embodiment, the hysteresis comparator B may obtain the voltage value of the output port Vout in real time, and then compare the voltage value of the output port Vout with the reference signal VT and the reference signal VB. When the voltage value of the output port Vout is less than the reference signal VB, an output current needs to be generated, so that the output voltage of the output port Vout is stabilized within a preset range. In this case, the transistor Q4 may be controlled to be turned on, and an input current supplied by the power supply port Vcc is supplied to the output port Vout and is supplied to the load as an output current. When detecting that the voltage value of the output port Vout is greater than the reference signal VT, the hysteresis comparator B may control the transistor Q4 to be turned off. When detecting again that the voltage value of the output port Vout is less than the reference signal VT, the hysteresis comparator B controls the transistor Q4 to be turned on.

Figure 4A:
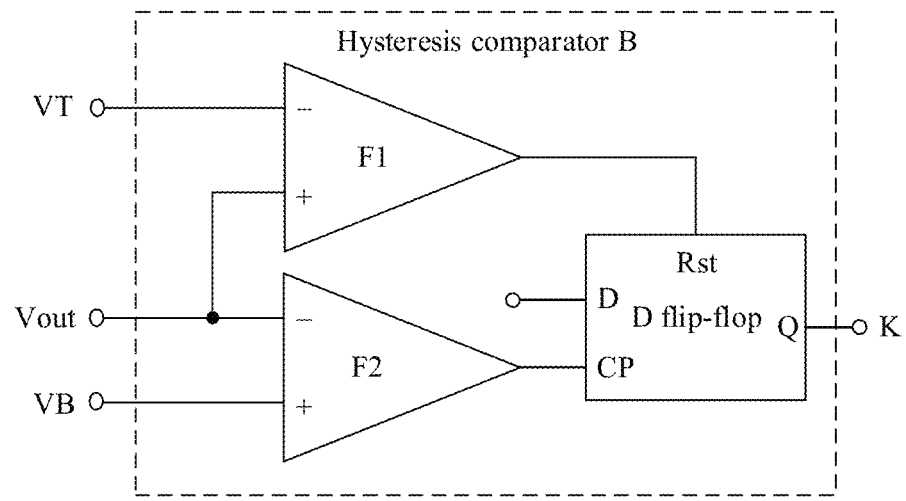
FIG. 4A is a schematic diagram of an internal structure of a hysteresis comparator according to an embodiment of this application.

In this embodiment, a circuit structure of the hysteresis comparator is shown in FIG. 4A. The hysteresis comparator B includes an integrated operational amplifier F1, an integrated operational amplifier F2, and a D flip-flop.

A non-inverting input terminal of the integrated operational amplifier F1 and an inverting input terminal of the integrated operational amplifier F2 are separately connected to the output port Vout. An inverting input terminal of the integrated operational amplifier F1 is configured to input the reference signal VT. A non-inverting input terminal of the integrated operational amplifier F2 is configured to input the reference signal VB. An output terminal of the integrated operational amplifier F1 is connected to a reset end Rst of the D flip-flop. An output terminal of the integrated operational amplifier F2 is connected to a clock signal end CP of the D flip-flop. An output end Q of the D flip-flop is the output terminal K of the hysteresis comparator B, and is configured to output a control signal.

A working principle of the charging circuit 02 including the hysteresis comparator B shown in FIG. 4A is described by using an example in which the clock signal end CP of the D flip-flop jumps from a low level to a high level and an input end D inputs a high level signal, an example in which a high level signal at the reset end Rst is valid, and an example in which the transistor Q4 is an NMOS transistor.

When the voltage of the output port Vout is greater than the reference signal VT, the integrated operational amplifier F1 outputs a high level signal, and the integrated operational amplifier F2 outputs a low level signal. In this case, the D flip-flop outputs a low level signal, and the transistor Q4 is cut off. When the voltage of the output port Vout is gradually reduced from being greater than the reference signal VT to being less than the reference signal VB, the integrated operational amplifier F1 outputs a low level signal, and a signal output by the integrated operational amplifier F2 jumps from a low level to a high level. In this case, the D flip-flop is turned on, the D flip-flop transmits, to the output end Q, the high level signal input from the input end D, and the transistor Q4 is turned on. When the voltage of the output port Vout is adjusted back to the reference signal VB, the output end Q of the D flip-flop keeps the output high level signal unchanged. When the voltage of the output port Vout is gradually increased from being less than the reference signal VB to being greater than the reference signal VT, a signal output by the integrated operational amplifier F1 jumps from a low level to a high level, and a signal output by the integrated operational amplifier F2 is at a low level. In this case, the D flip-flop is reset, the output end Q of the D flip-flop outputs a low level signal, and the transistor Q4 is cut off.

Figure 4B:
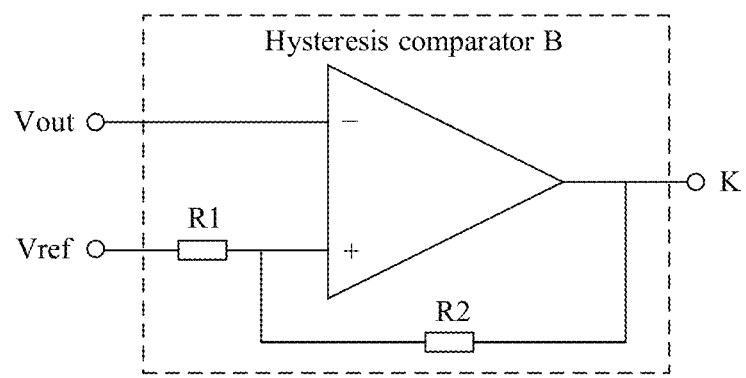
FIG. 4B is a schematic diagram of another internal structure of a hysteresis comparator according to an embodiment of this application.

In this embodiment, a circuit structure of the hysteresis comparator may alternatively be shown in FIG. 4B. Different from the circuit structure of the hysteresis comparator shown in FIG. 4A, the circuit structure of the hysteresis comparator shown in FIG. 4B includes two input terminals. The hysteresis comparator generates the reference signal VT and the reference signal VB by adjusting an input reference voltage signal Vref. Specifically, the hysteresis comparator B shown in FIG. 4B includes an integrated operational amplifier, a resistor R1, and a resistor R2. An inverting input terminal of the integrated operational amplifier is connected to the output port Vout. A positive input terminal of the integrated operational amplifier is connected to one terminal of the resistor R1, and the other terminal of the resistor R1 is configured to input the reference voltage signal Vref. A branch in which the resistor R2 is located is disposed between the positive input terminal and an output terminal of the integrated operational amplifier as a feedback channel. The output terminal K of the integrated operational amplifier is connected to the transistor Q4.

Parameters of the hysteresis comparator B satisfy the following equations (1) and (2):

$$Vref \times R2/(R1+R2) = VB \quad (1)$$

$$Vcc \times R1/(R1+R2) + Vref \times R2/(R1+R2) = VT \quad (2)$$

Herein, the reference signal VT and the reference signal VB are determined based on a load running power and a voltage required by the load to run. Vcc is a voltage value of an external power supply system. A voltage value of the reference voltage signal Vref may be determined by adjusting resistance values of the resistor R1 and the resistor R2. After the reference voltage signal Vref is determined, the hysteresis comparator B shown in FIG. 4B may generate the reference signal VT and the reference signal VB. In addition, the reference signal VT and the reference signal VB need to be dynamically adjusted based on the voltage required by the load to run, in this case, the voltage value of the reference voltage signal Vref may be changed by adjusting the resistance values of the resistor R1 and the resistor R2, to adjust values of the reference signal VT and the reference signal VB.

It should be noted that the specific structure of the hysteresis comparator B shown in FIG. 4A and FIG. 4B is an example, and the specific structure of the hysteresis comparator B may be further adjusted based on a requirement of an application scenario.

In the power management system in the conventional technology, no charging circuit 02 is generally disposed. When the output voltage of the output port Vout transiently drops, the power management system increases switching frequencies of the transistor Q1 and the transistor Q2 to increase transient response time. The buck circuit usually supplies power to the load based on a power supply period. When power consumption of the load is excessive, the buck circuit needs to change a duty cycle of the control signal in a next power supply period after the current power supply period is executed, to increase the turn-on time of the transistor Q1, so as to increase the power supply amount, so that the output voltage is adjusted back. In the conventional technology, the transient response time is usually increased by reducing duration of the power supply period and increasing the switching frequencies of the transistor Q1 and the transistor Q2. For example, the switching frequency is increased from 2 MHz to 4 MHz. The transistor Q1 and the transistor Q2 are energy-consuming elements. Due to the existence of parasitic resistances of the transistor Q1 and the transistor Q2, as turn-on or turn-off time of the transistor Q1 and the transistor Q2 increases, energy losses of the transistor Q1 and the transistor Q2 increase. Therefore, a transient response of the buck circuit is obtained by increasing the switching frequencies of the transistor Q1 and the transistor Q2, which greatly reduces energy conversion efficiency. The power management system in the conventional technology also increases the transient response time by reducing an inductance of the inductor L0. The inductor is an energy storage element. Because a current on the inductor L0 cannot abruptly change, after the external power supply system stops supplying power, energy stored in the inductor may supply electric energy to the load to supply power to the load. A larger inductance indicates more energy that can be stored in a switching period. When the inductance of the inductor L0 is reduced, the energy that can be stored in one power supply period is reduced. When the same energy is supplied to the load, the value of the reference signal Vset needs to be increased to increase the energy supplied by the power supply port. In this way, when the energy consumed by the load is less than the energy input by the buck circuit, electric energy is wasted, and consequently, energy utilization is reduced. However, in this application, the charging circuit 02 is provided, so that the load can be charged in time at a moment when the energy consumption of by load is excessively high to pull down the voltage of the output port Vout, and charging is stopped after the voltage of the output port Vout increases, to avoid a case such as an abnormal power failure of the load due to an insufficient power supply. Compared with the conventional technology, the buck circuit shown in this embodiment of this application can reduce the switching frequencies of the transistor Q1 and the transistor Q2, and does not need to reduce an energy value of the inductor L0, thereby ensuring power usage efficiency. In addition, in this embodiment of this application, a capacitance of the capacitor C1 in the buck circuit may be reduced (for example, a 23 uF capacitor may be used in this embodiment, but a 60 uF capacitor needs to be used in the conventional buck circuit). This helps simplify a layout area.

Figure 5:
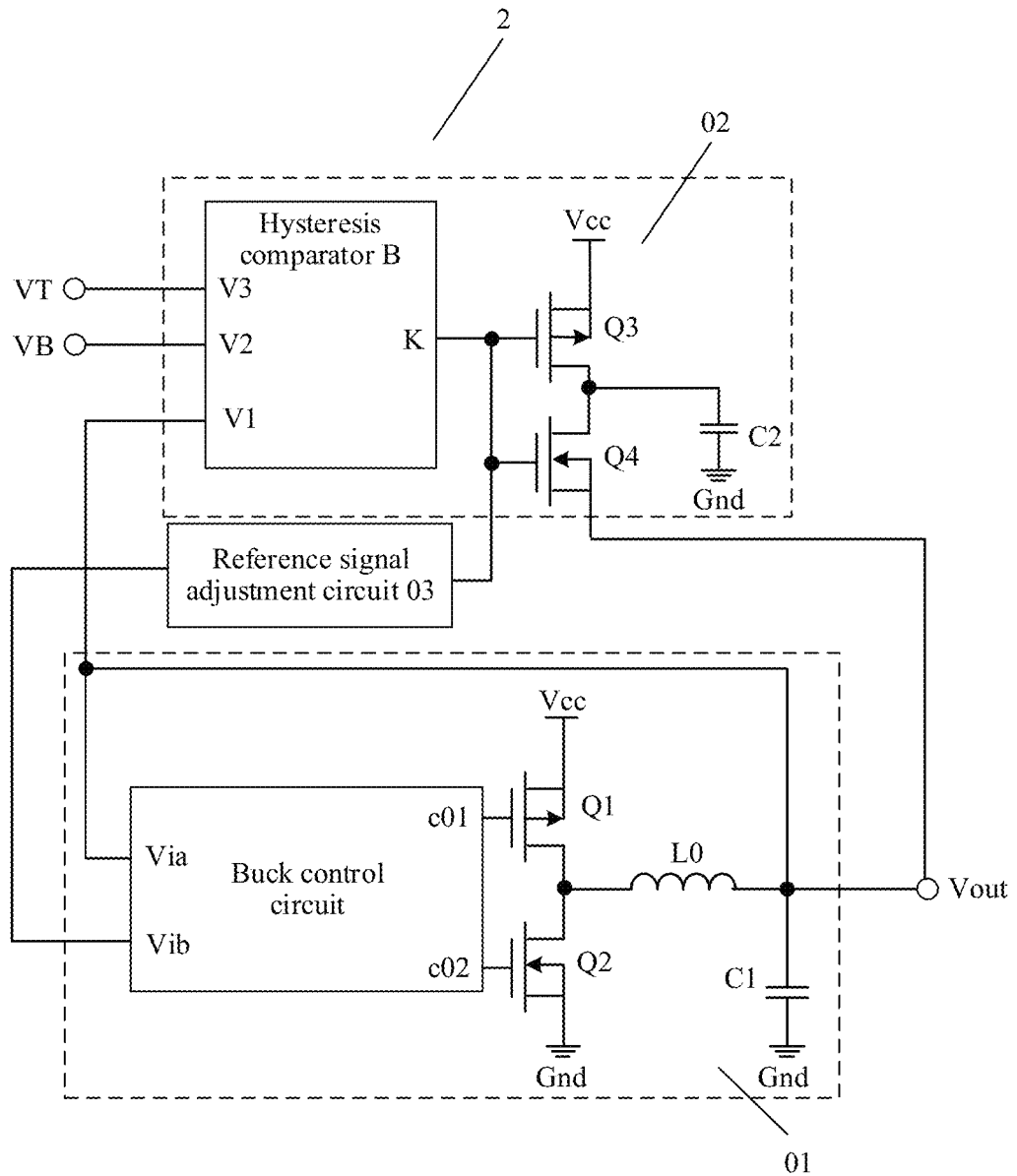
FIG. 5 is a schematic diagram of another structure of a power management system according to an embodiment of this application.

FIG. 5 shows a schematic diagram of a structure of another embodiment of the power management system 2 shown in FIG. 1. In FIG. 5, the power management system 2 includes a DC-DC conversion circuit 01 and a charging circuit 02. The DC-DC conversion circuit 01 includes a buck control circuit, a transistor Q1, a transistor Q2, an inductor L0, and a capacitor C1. The charging circuit 02 includes a hysteresis comparator B and a transistor Q4. For an internal structure of the buck control circuit, refer to the related descriptions shown in FIG. 3. For an internal structure of the hysteresis comparator B, refer to the related descriptions shown in FIG. 4A or FIG. 4B. For a connection relationship between a circuit and a component, refer to the related descriptions in the embodiment shown in FIG. 2. Details are not described herein again.

Different from the power management system 2 shown in FIG. 2, in this embodiment, the charging circuit 02 further includes a transistor Q3 and a capacitor C2. A control terminal of the transistor Q3 is connected to an output terminal K of the hysteresis comparator B. A first terminal of the transistor Q4 is connected to a second terminal of the transistor Q3 and one terminal of the capacitor C2. A second terminal of the transistor Q4 is connected to an output port Vout. The other terminal of the capacitor C2 is connected to a common ground Gnd. Herein, the transistor Q3 and the transistor Q4 have different turn-on times. When the transistor Q3 is turned on, the transistor Q4 is turned off. When the transistor Q4 is turned on, the transistor Q3 is turned off. The transistor Q3 and the transistor Q4 may be transistors of a same type (for example, a PMOS transistor or an NMOS transistor), or may be transistors of different types. When the transistor Q3 and the transistor Q4 are transistors of the same type, an inverter is disposed between the output terminal K and the transistor Q3 or the transistor Q4.

In this embodiment, the hysteresis comparator B may obtain a voltage value of the output port Vout in real time, and then compare the voltage value of the output port Vout with a reference signal VT and a reference signal VB. When the voltage value of the output port Vout is greater than the reference signal VT, the transistor Q3 is controlled to be turned on, and the transistor Q4 is controlled to be turned off. In this case, an external power supply system charges the capacitor C2 by using the transistor Q3. When the hysteresis comparator B detects that the voltage value of the output port Vout is less than the reference signal VB, an output current needs to be generated, so that an output voltage of the output port Vout is stabilized within a preset range. In this case, the transistor Q3 may be controlled to be turned off, the transistor Q4 may be controlled to be turned on, and the capacitor C2 quickly charges a load by using the transistor Q4. When detecting again that the voltage value of the output port Vout is greater than the reference signal VT, the hysteresis comparator B controls the transistor Q3 to be turned on and controls the transistor Q4 to be turned off, so as to charge the capacitor C2.

It can be learned from the power management system 2 shown in FIG. 5 that, different from the power management system 2 shown in FIG. 2, when the voltage of the output port Vout is less than the reference signal VB, a power supply port Vcc is not used to directly supply an output current to the output port Vout, but the capacitor C2 is precharged by using the external power supply system. When the voltage of the output port Vout is less than the reference signal VB, the capacitor C2 discharges to generate the output current.

In some scenarios, because the charging circuit 02 supplies the output current to the output port Vout, the voltage of the output port Vout increases. However, the voltage of the output port Vout received by an input terminal Via of the buck control circuit may be a value obtained through voltage compensation. A difference between the value and the reference signal Vset is usually small. Therefore, the buck control circuit reduces power supply duration in a power supply period to reduce output electric energy (reduce the output current or output voltage). In this case, if the charging circuit 02 does not continuously supply power or a remaining voltage after the capacitor C2 discharges is insufficient to support the load, the power supply is usually insufficient.

To eliminate the impact of the charging circuit 02 on the buck circuit, in some optional implementations of this embodiment, a reference signal adjustment circuit 03 may be further provided. Specifically, an input terminal of the reference signal adjustment circuit 03 is connected to the output terminal K of the hysteresis comparator B. An output terminal of the reference signal adjustment circuit 03 is connected to an input terminal Vib of the buck control circuit. The reference signal adjustment circuit 03 is configured to increase a value of the reference signal Vset input to the buck control circuit during charging of the charging circuit 02. A duration in which the value of the reference signal Vset is increased is greater than or equal to the time in which the buck control circuit responds to excessive electric energy consumption by the load.

The signal adjustment circuit 03 is provided to adjust the value of the reference signal Vset, so that when the charging circuit 02 supplies the output current to the output port Vout, the value of the reference signal Vset may be increased, to increase the difference between the reference signal Vset and the voltage of the output port Vout, so as to prevent the DC-DC conversion circuit 01 from reducing the power supply duration in the power supply period to reduce a power supply amount. When the charging circuit 02 stops supplying the output current to the output port Vout, it indicates that the voltage is adjusted back to an upper limit of an expected output voltage. The value of the reference signal Vset is reduced, to reduce the difference between the reference signal Vset and the voltage of the output port Vout, so as to prevent the DC-DC conversion circuit 01 from maintaining a large power supply amount and wasting electric energy.

Figure 6:
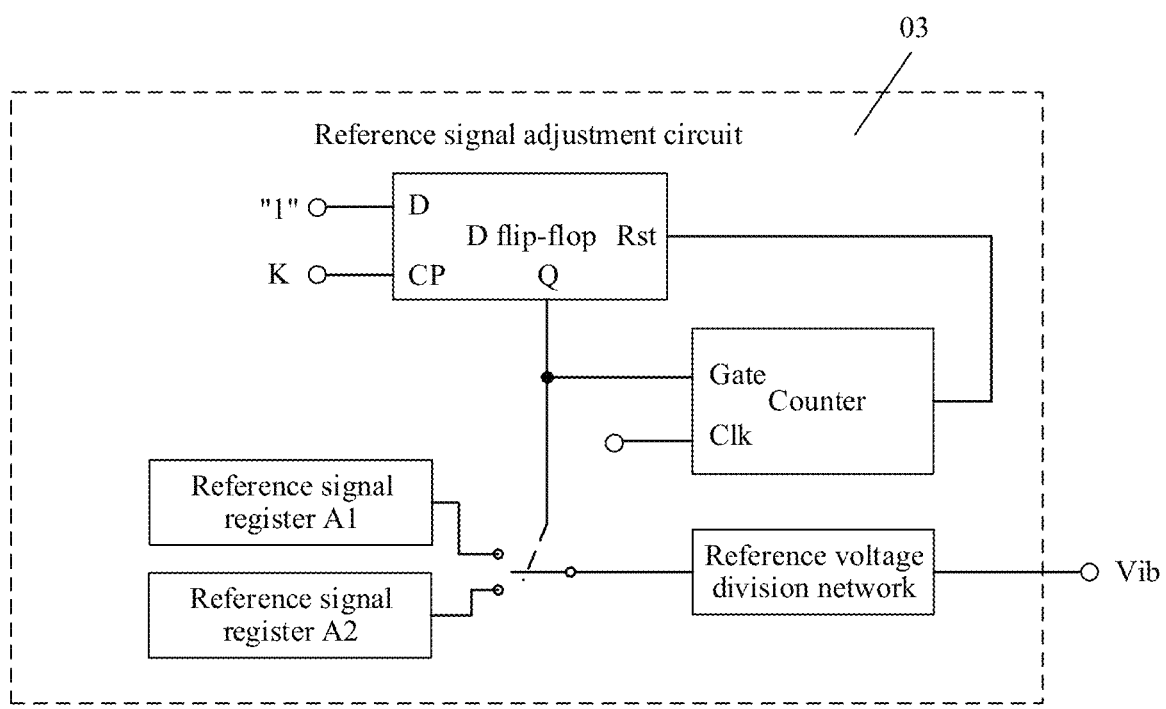
FIG. 6 is a schematic diagram of a structure of a reference signal adjustment circuit according to an embodiment of this application.

For a specific structure of the reference signal adjustment circuit 03, refer to FIG. 6. The reference signal adjustment circuit 03 may include a D flip-flop, a counter, a reference signal register A1, a reference signal register A2, and a reference voltage division network. A clock signal end CP of the D flip-flop is connected to the output terminal K of the hysteresis comparator B. An input end D of the D flip-flop is configured to input a transmission signal. A reset end Rst of the D flip-flop is connected to an output end of the counter. A signal output from an output end Q of the D flip-flop is used to control the reference signal register A1 or the reference signal register A2 to be connected to an input end of the reference voltage division network. An output end of the reference voltage division network is connected to the input terminal Vib of the buck control circuit. A control end Gate of the counter is connected to the output end Q of the D flip-flop. A clock signal end Clk of the counter is configured to input a clock signal.

The D flip-flop is an edge flip-flop. When a signal input from the clock signal end CP of the D flip-flop changes from invalid to valid (for example, from a low level to a high level), that is, when a rising edge occurs in the input signal, the D flip-flop supplies, to the output end Q, a signal input from the input end D, to output the signal from the output end Q. When the reset end Rst of the D flip-flop receives a reset signal, the D flip-flop is reset, and the output end Q outputs an initial setting signal. Specifically, when the D flip-flop is reset so that the output end Q outputs initial setting signal logic "1", the input end D of the D flip-flop is configured to input logic "0". When the D flip-flop is reset so that the output end Q outputs initial setting signal logic "0", the input end D of the D flip-flop is configured to input logic "1". FIG. 6 schematically shows a case in which the input end D of the D flip-flop inputs the logic "1" and the output end Q of the D flip-flop outputs the initial setting signal logic "0" because the D flip-flop is reset.

Based on the structure of the reference signal adjustment circuit 03 shown in FIG. 6, when a signal output from the output terminal K of the hysteresis comparator B jumps from a low level to a high level, the transistor Q4 is triggered to be turned on, and in this case, the transistor Q4 is an NMOS transistor. If the transistor Q4 is a PMOS transistor, the inverter may be disposed between the output terminal of the hysteresis comparator B and the transistor Q4. The input end D of the D flip-flop inputs a high level signal or a signal "logic 1". When the D flip-flop is reset, the output end Q of the D flip-flop outputs the "logic 0".

The reference signal register A1 stores a first voltage value of the reference signal Vset. The reference signal register A2 stores a second voltage value of the reference signal Vset. The first voltage value is greater than the second voltage value, and an increased value is determined based on a voltage increased by the output port Vout during charging.

The reference voltage division network is configured to convert the first voltage value or the second voltage value into an analog signal. The reference voltage division network herein may be a digital-to-analog conversion circuit. Specifically, the reference voltage division network may include a voltage regulator chip, a single-input multi-output selector, and a voltage divider resistor array. The voltage regulator chip is configured to output a voltage of a specific value (for example, 3 V). An output end of the voltage regulator chip is connected to an input end of the selector. The selector may be controlled by a first voltage signal or a second voltage signal, so that the input end of the selector is connected to one voltage division end of the voltage divider resistor array, and a corresponding analog voltage signal is obtained through voltage division of the voltage divider resistor array.

When the signal output from the output terminal of the hysteresis comparator B changes from the low level to the high level, the input end D of the D flip-flop inputs the "logic 1". Under control of the "logic 1", the reference signal register A1 is connected to the reference voltage division network, and the reference voltage division network generates an analog voltage signal after processing the first voltage value stored in the reference signal register A1, and supplies the analog voltage signal to the input terminal Vib of the buck control circuit. Meanwhile, the counter starts timing. When a time counted by the counter reaches $\Delta T$, a reset signal is sent to the D flip-flop. After the D flip-flop receives the reset signal, the output end Q outputs the "logic 0". In this case, the reference signal register A2 is connected to the reference voltage division network. The reference voltage division network generates an analog voltage signal after processing the second voltage value stored in the reference signal register A2, and supplies the analog voltage signal to the input terminal Vib of the buck control circuit. Herein, $\Delta T$ is greater than or equal to the time in which the buck control circuit responds to excessive electric energy consumption by the load.

Figure 7:
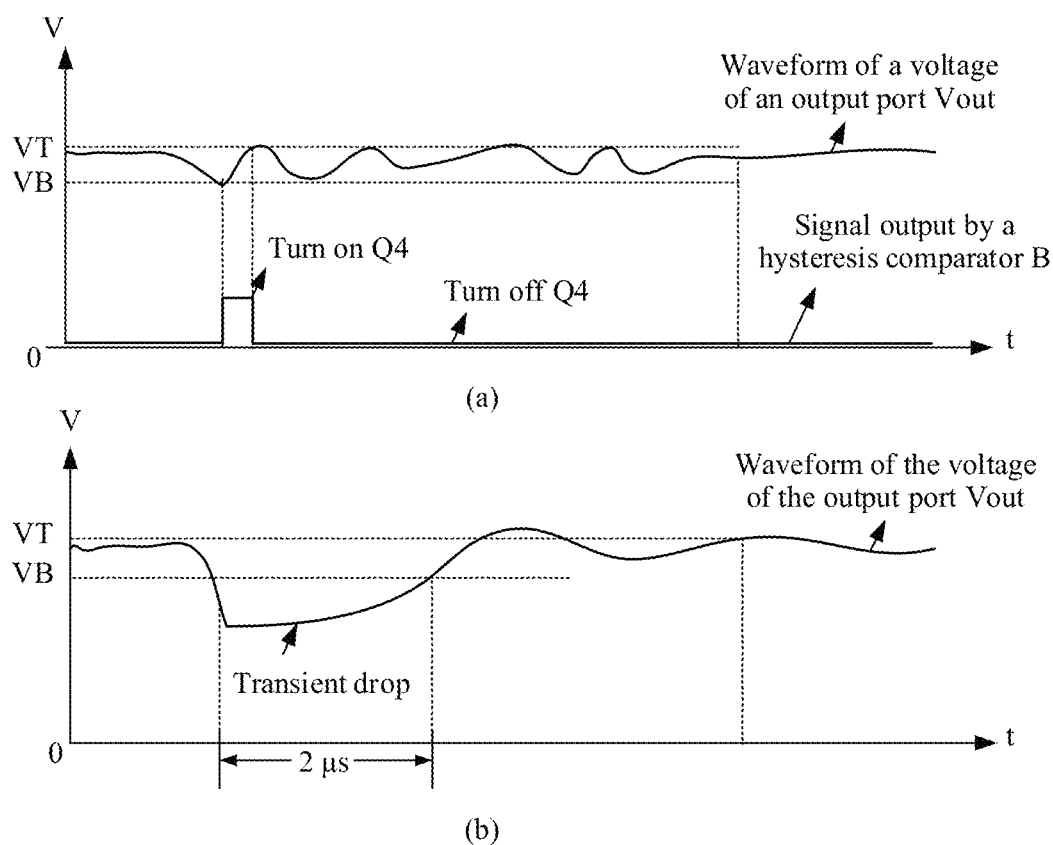
FIG. 7 is a diagram of waveform comparison between an output port of the power management system shown in FIG. 5 and an output port of a power management system in a related technology according to an embodiment of this application.

In FIG. 7, (a) shows a waveform of the output voltage of the output port Vout after the charging circuit 02 is provided; (b) in FIG. 7 shows a waveform of the output voltage of the output port Vout when no charging circuit 02 is provided. VB is a difference between the reference signal Vset and the offset $\Delta V2$. VT is a sum of the reference signal Vset and the offset $\Delta V1$. It can be seen from FIG. 7 that, when no charging circuit 02 is provided, the waveform of the output voltage of the output port Vout drops far below VB at a moment, and it takes a long time, for example, 2 μs, for the voltage of the output port Vout to recover to above VB. After the charging circuit 02 is provided, when the voltage of the output port Vout reaches a voltage lower limit VB, the hysteresis comparator B controls the transistor Q4 to be turned on, so that the output port Vout of the charging circuit 02 supplies an output current, and the voltage of the output port Vout increases. When the voltage of the output port Vout reaches VT, the hysteresis comparator B controls the transistor Q4 to be turned off, so that the charging circuit 02 stops providing a current. Therefore, the output voltage of the output port Vout is stably limited within a range of VB to VT. Stability of the output voltage of the output port Vout is improved.

Figure 8:
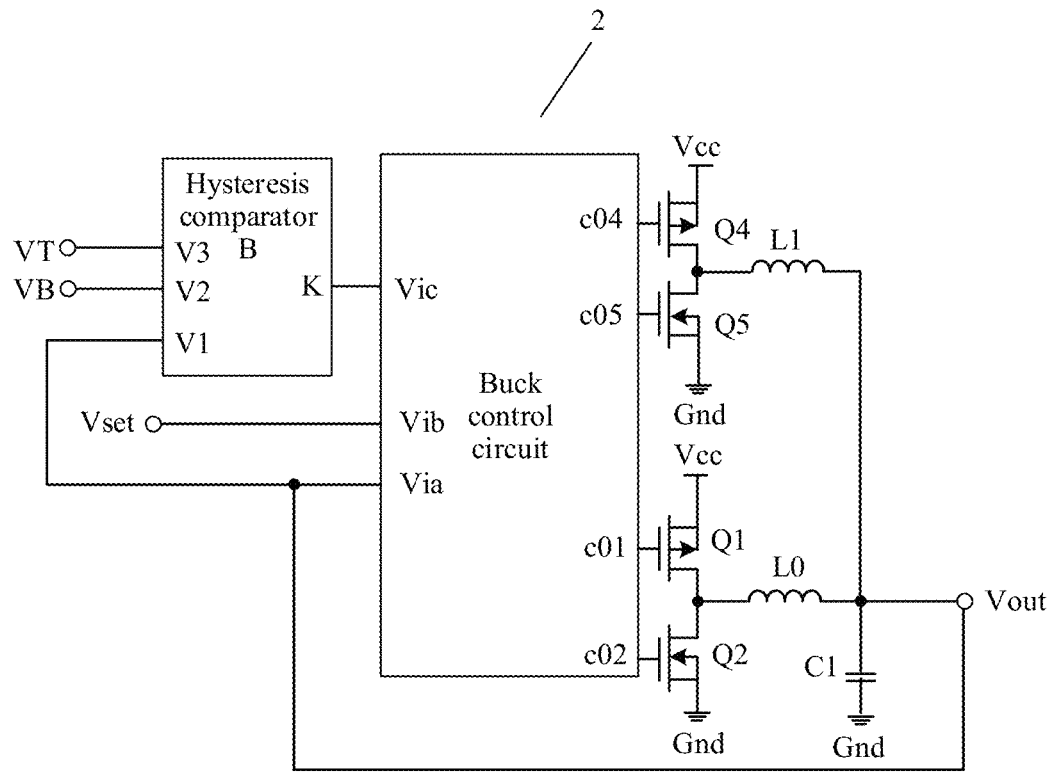
FIG. 8 is a schematic diagram of still another structure of a power management system according to an embodiment of this application.

FIG. 8 shows a schematic diagram of a structure of still another embodiment of the power management system 2 shown in FIG. 1. In FIG. 8, the power management system 2 includes a buck control circuit, a hysteresis comparator B, a transistor Q1, a transistor Q2, a transistor Q4, a transistor Q5, an inductor L0, an inductor L1, and a capacitor C1. The transistor Q1, the transistor Q2, the inductor L0, and the capacitor C1 belong to the one-phase buck circuit. Different from the power management system 2 shown in FIG. 2 and FIG. 5, in this embodiment, the transistor Q4, the transistor Q5, the inductor L1, and the capacitor C1 may belong to another one-phase buck circuit. That is, the buck circuit shown in this embodiment is a dual-phase buck circuit. A charging circuit 02 and a DC-DC conversion circuit 01 share the transistor Q4, the transistor Q5, and the inductor L1.

Specifically, an output terminal K of the hysteresis comparator B is connected to an input terminal Vic of the buck control circuit. A control terminal of the transistor Q4 is connected to an output terminal c04 of the buck control circuit. A control terminal of the transistor Q5 is connected to an output terminal c05 of the buck control circuit. A first terminal of the transistor Q4 is connected to a power supply port Vcc. A second terminal of the transistor Q5 is connected to a common ground Gnd. A second terminal of the transistor Q4 and a first terminal of the transistor Q5 are connected to one terminal of the inductor L1. The other terminal of the inductor L1 is connected to an output port Vout. For an internal structure of the hysteresis comparator B, refer to the internal structure shown in FIG. 4A or FIG. 4B. The transistor Q4 and the transistor Q5 have different turn-on times.

It can be seen from FIG. 8 that, different from the foregoing embodiments, in this embodiment, the output terminal K of the hysteresis comparator B is not directly connected to the control terminals of the transistor Q4 and the transistor Q5, but is connected to the control terminals of the transistor Q4 and the transistor Q5 through the buck control circuit. Therefore, when a voltage of the output port Vout is less than a reference signal VB, the transistor Q4 is turned on, and the charging circuit 02 supplies an output current to the output port Vout. When a voltage of the output port Vout is greater than a reference signal VT, the transistor Q4 is turned off, and the charging circuit 02 stops supplying a current. In this case, the transistor Q4, the transistor Q5, and the inductor L1 operate as a one-phase buck under control of the buck control circuit.

Figure 9:
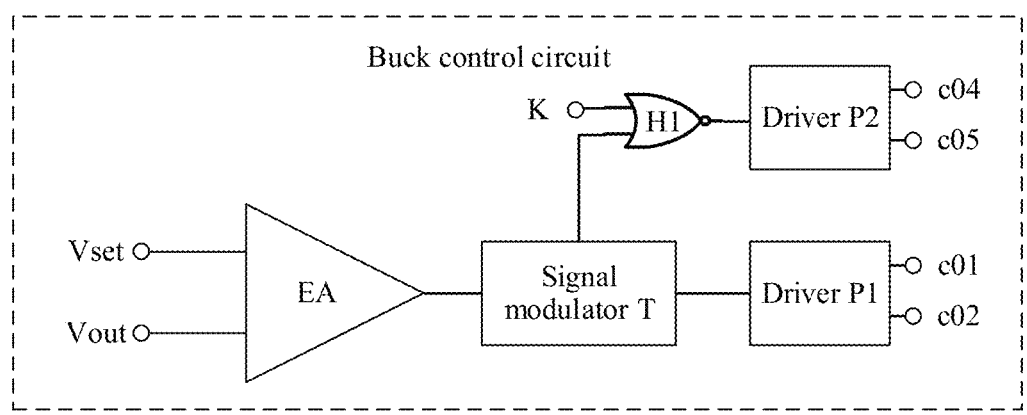
FIG. 9 is a schematic diagram of another internal structure of a buck control circuit according to an embodiment of this application.

Based on the power management system 2 shown in FIG. 8, a specific structure of the buck control circuit may be shown in FIG. 9. In FIG. 9, the buck control circuit includes an error amplifier EA, a signal modulator T, a driver P1, a driver P2, and a NOR gate H1. One input terminal of the error amplifier EA is connected to the output port Vout, and the other input terminal of the error amplifier EA is configured to input a reference signal Vset. An output terminal of the error amplifier EA is connected to an input terminal of the signal modulator T. One output terminal of the signal modulator T is connected to an input terminal of the driver P1, and the other output terminal of the signal modulator T is connected to one input terminal of the NOR gate H1. The output terminal K of the hysteresis comparator B is connected to the other input terminal of the NOR gate H1. An output terminal of the NOR gate H1 is connected to an input terminal of the driver P2. The driver P1 is connected to a control terminal of the transistor Q1 through an output terminal c01, and is connected to a control terminal of the transistor Q2 through an output terminal c02. The driver P2 is connected to the control terminal of the transistor Q4 through an output terminal c04, and is connected to the control terminal of the transistor Q5 through an output terminal c05. For a working principle of the error amplifier EA, a structure and a working principle of the signal modulator T, and working principles of the driver P1 and the driver P2, refer to the related descriptions shown in FIG. 3. Details are not described herein again. It should be noted that the specific structure of the buck control circuit shown in FIG. 9 is an example, and the specific structure of the buck control circuit may be adjusted based on a requirement of an application scenario. This is not limited herein. It should be noted herein that, if the transistor Q4 is a PMOS transistor, the transistor Q5 is an NMOS transistor, a low level signal output from the output terminal K of the hysteresis comparator is valid, and a low level output from the output terminal of the signal modulator T is valid, an AND gate may be used. The following describes a principle by using an example in which the transistor Q4 is the PMOS transistor, the transistor Q5 is the NMOS transistor, and the NOR gate is used.

When the hysteresis comparator B detects that a voltage value of the output port Vout is less than the reference signal VB, the hysteresis comparator B outputs a high level signal. In this case, regardless of a signal output by the signal modulator T, after a NOR operation is performed on the signal and the high level signal output by the hysteresis comparator B, the signal is a low level signal. After the signal is processed by the driver P2, the transistor Q4 is controlled to be turned on, and the power supply port Vcc supplies the output current to the output port Vout by using the transistor Q4. When the hysteresis comparator B detects that a voltage value of the output port Vout is greater than the reference signal VT, the hysteresis comparator B outputs a low level signal, and the power supply port Vcc stops outputting the current through a branch in which the transistor Q4 is located. A signal output from the output terminal of the NOR gate H1 is controlled by a signal output by the signal modulator T. In this case, the transistor Q4, the transistor Q5, and the inductor L1 operate as the one-phase buck under the control of the buck control circuit. That is, when the charging circuit 02 stops charging, the power management system 2 uses the dual-phase buck circuit to supply power to a load. To be specific, one input terminal of the NOR gate H1 receives a second control signal, and the other input terminal K of the NOR gate H1 receives a first control signal from the charging circuit 02, so that the NOR gate H1 outputs a third control signal. The third control signal is obtained by performing a NOR operation on the first control signal and the second control signal, and is used to control the transistor Q4. The transistor Q4 is controlled by the third control signal, or it may be considered that the transistor Q4 is jointly controlled by the first control signal and the second control signal, and operates based on control of the first control signal and the second control signal.

It can be learned from this embodiment that, in a scenario in which the power management system 2 uses the two-phase buck circuit to supply the power to the load, when electric energy consumption by the load is excessive, the one-phase buck circuit may serve as a part of the charging circuit 02, and under control of the hysteresis comparator B, the power supply port Vcc directly supplies electric energy to the output port Vout by using the transistor Q4. Therefore, a quantity of transistors is reduced. In addition, the buck circuit shown in this embodiment may also use a small-capacitance capacitor (for example, a 23 uF capacitor), which may reduce a layout area.

In this embodiment, due to the existence of the inductor L1, in an initial phase in which the power supply port Vcc supplies the electric energy to the output port Vout by using the transistor Q4, the voltage of the output port Vout continues to drop, and a voltage drop amplitude $\Delta$Vd is related to an inductance value L1 and an ESR of the capacitor C1. The ESR is an equivalent parasitic resistance of a capacitor.

Figure 10:
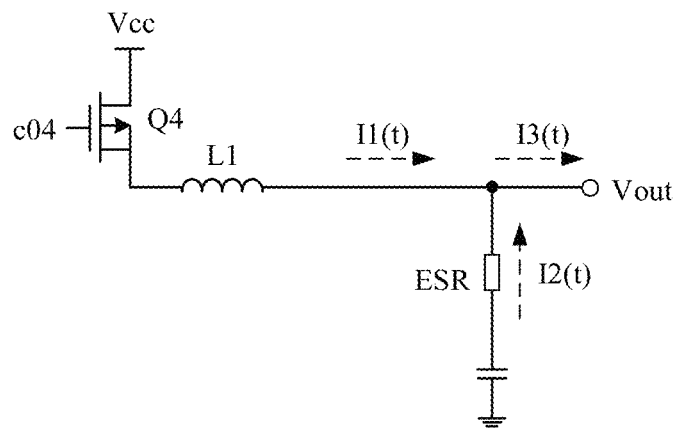
FIG. 10 is an equivalent circuit diagram of a charging circuit during charging according to an embodiment of this application.

The following describes the impact of the parameter configuration of the inductor L1 on the circuit shown in FIG. 8 by using an equivalent circuit diagram of the charging circuit 02 during power supply shown in FIG. 10 and formulas (3) to (11).

Imax indicates a maximum transient current of the load. The voltage supplied by the power supply port Vcc is VBAT. L0 indicates an inductance value of the inductor L0. C1 indicates a capacitance value of the capacitor C1. The ESR indicates a resistance value of an equivalent parasitic resistance ESR of the capacitor C1. A time point at which the transistor Q4 just starts to be turned on is 0. Vout indicates the voltage value of the output port Vout. A voltage drop of the voltage of the output port Vout after the time point 0 is $\Delta$Vd(t). In the drawing, tm indicates a time period in which the voltage of the output port Vout drops to a lowest point. I1(t) indicates a current flowing through the inductor L1. I2(t) indicates a current flowing through the resistor ESR. I3(t) indicates a current flowing through the load.

$$I3(t) = I\max \quad (3)$$

$$I1(t) = (VBAT - Vout)/L0 \times t \quad (4)$$

$$I2(t) = I\max - (VBAT - Vout)/L0 \times t \quad (5)$$

It can be learned from formula (3) to formula (5) that, as I1(t) gradually increases, I2(t) gradually decreases.

$$S = (VBAT - Vout)/L0 \quad (6)$$

At a moment when the transistor Q4 is turned on, Vout continues to drop.

$$\Delta Vd(t) = S \times ESR \times t - (I\max - S/2 \times t) \times t/C1 = \quad (7)$$

$$S/2/C1 \times t^{\wedge}2 + (S \times ESR - I\max/C1) \times t$$

Solve a derivative of ΔVd(t):

$$\Delta Vd'(t) = S/C1 \times t + (S \times ESR - I\max/C1) \quad (8).$$

Set that $$\Delta Vd'(t) = 0 \quad (9).$$

That is, a drop duration after the transistor Q4 is turned on is calculated:

$$tm = I\max \times /S - ESR \times C1 \quad (10).$$

$$\Delta Vd = S/2/C1 \times tm\,\hat{}\,2 + (S \times ESR - I\max/C1) \times tm \quad (11)$$

It can be learned from formula (3) to formula (11) that, a smaller inductance value of the inductor L1 indicates a shorter time period tm in which the voltage of the output port Vout drops to the lowest point and a smaller amplitude ΔVd at which the voltage of the output port Vout drops to the lowest point. Therefore, the inductance value of the inductor L1 may be set based on a requirement of ΔVd.

Figure 11:
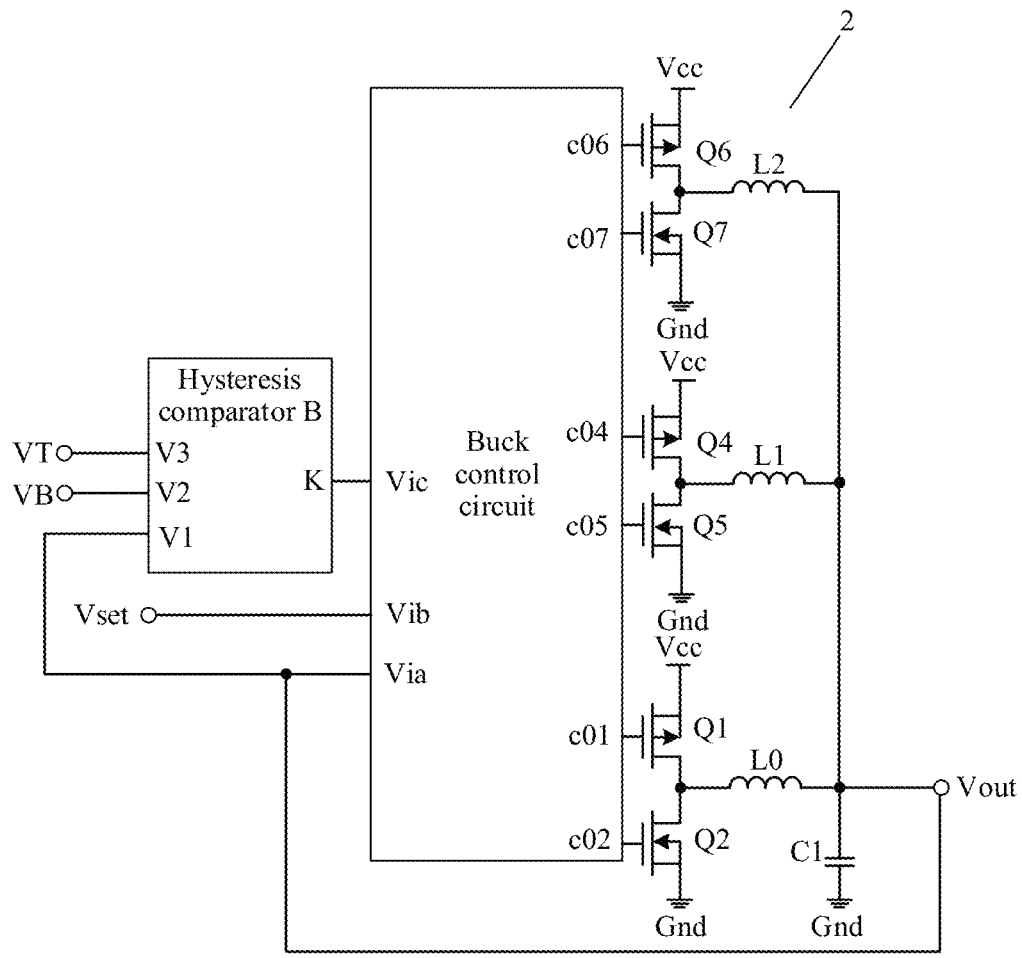
FIG. 11 is a schematic diagram of yet still another structure of a power management system according to an embodiment of this application.

FIG. 11 shows a schematic diagram of a structure of yet still another embodiment of the power management system 2 shown in FIG. 1. In FIG. 11, the power management system 2 includes a buck control circuit, a hysteresis comparator B, a transistor Q1, a transistor Q2, a transistor Q4, a transistor Q5, an inductor L0, an inductor L1, and a capacitor C1. The transistor Q1, the transistor Q2, the inductor L0, and the capacitor C1 belong to a one-phase buck circuit. During a non-charging period, the transistor Q4, the transistor Q5, the inductor L1, and the capacitor C1 belong to a one-phase buck circuit. For a connection relationship between the buck control circuit and each element, a connection relationship between elements, a connection relationship between the hysteresis comparator B and each element, and an internal structure of the hysteresis comparator, refer to the related descriptions in the embodiment shown in FIG. 8. Different from the power management system 2 shown in FIG. 8, in this embodiment, the power management system 2 further includes a driver P3, a transistor Q6, a transistor Q7, and an inductor L2. The transistor Q6, the transistor Q7, the inductor L2, and the capacitor C1 may also belong to a one-phase buck circuit. That is, the buck circuit shown in this embodiment is a three-phase buck circuit. A control terminal of the transistor Q6 and a control terminal of the transistor Q7 are respectively connected to an output terminal c06 and a control terminal c07 of the buck control circuit. A first terminal of the transistor Q6 is connected to a power supply port Vcc. A second terminal of the transistor Q7 is connected to a common ground Gnd. A second terminal of the transistor Q6 and a first terminal of the transistor Q7 are connected to one terminal of the inductor L2. The other terminal of the inductor L2 is connected to an output port Vout. The transistor Q6 and the transistor Q7 have different turn-on times.

In this embodiment, when a voltage of the output port Vout is less than a reference signal VB, the transistor Q4 and the transistor Q6 are turned on, and the power supply port Vcc supplies electric energy to the output port Vout through two channels (that is, a branch in which the inductor L1 is located and a branch in which the inductor L2 is located) to charge a load. When a voltage of the output port Vout is greater than a reference signal VT, the power supply port Vcc stops charging. In this case, the transistor Q4, the transistor Q5, the inductor L1 and the capacitor C1 operate as a one-phase buck circuit under control of the buck control circuit. The transistor Q6, the transistor Q7, the inductor L2 and the capacitor C1 operate as a one-phase buck circuit under the control of the buck control circuit.

Based on the power management system 2 shown in FIG. 11, a specific structure of the buck control circuit may be shown in FIG. 12. In FIG. 12, the buck control circuit includes an error amplifier EA, a signal modulator T, a driver P1, a driver P2, and a NOR gate H1. For a connection relationship between components and a working principle of each component, refer to the related descriptions of the buck control circuit shown in FIG. 3 and FIG. 9, and details are not described herein again. Different from the buck control circuit shown in FIG. 9, the buck control circuit shown in this embodiment further includes a driver P3 and a NOR gate H2. The signal modulator T further includes a third output terminal. The third output terminal of the signal modulator T is connected to one input terminal of the NOR gate H2. An output terminal K of the hysteresis comparator B is further connected to the other input terminal of the NOR gate H2. An output terminal of the NOR gate H2 is connected to an input terminal of the driver P3. The driver P3 is connected to the control terminal of the transistor Q6 through the output terminal c06, and is connected to the control terminal of the transistor Q7 through the output terminal c07. It should be noted herein that the NOR gate H2 shown in FIG. 11 may also be replaced with an AND gate. Specifically, if the transistor Q6 is a PMOS transistor, the transistor Q7 is an NMOS transistor, a low level signal output from the output terminal K of the hysteresis comparator is valid, and a low level output from the output terminal of the signal modulator T is valid, the AND gate may be used. This implementation is not shown in the figure. It should be noted that a specific structure of the buck control circuit shown in FIG. 12 is an example, and the specific structure of the buck control circuit may be adjusted based on a requirement of an application scenario. This is not limited herein. The following describes a principle by using an example in which the transistor Q6 is the PMOS transistor, the transistor Q7 is the NMOS transistor, and the NOR gate is used.

When the hysteresis comparator B detects that a voltage value of the output port Vout is less than the reference signal VT, the hysteresis comparator B outputs a high level signal. In this case, regardless of a signal output by the signal modulator T, after a NOR operation is performed on the signal and the high level signal output by the hysteresis comparator B, the signal is a low level signal. After the signal is processed by the driver P2 and the driver P3, the transistor Q4 and the transistor Q6 are separately controlled to be turned on, and the power supply port Vcc supplies an output current to the output port Vout through the two channels (that is, the branch in which the inductor L1 is located and the branch in which the inductor L2 is located) to charge the load. When the hysteresis comparator B detects that a voltage value of the output port Vout is greater than the reference signal VT, the hysteresis comparator B outputs a low level signal. In this case, signals output from the output terminals of the NOR gate H1 and the NOR gate H2 are controlled by the signal output by the signal modulator T, and phases of the signals are opposite to a phase of the signal output by the signal modulator T. When the charging circuit 02 stops charging, the power management system 2 uses the three-phase buck circuit to supply power to the load.

For selection of parameters of the inductor L1 and the inductor L2 in this embodiment, refer to the related descriptions in the embodiment shown in FIG. 8, and details are not described herein again. It can be learned from this embodiment that, in a scenario in which the power management system 2 uses the three-phase buck circuit to supply the power to the load, when electric energy consumption by the load is excessive, a two-phase buck circuit may serve as a part of the charging circuit 02, and under control of the hysteresis comparator B, the power supply port Vcc directly supplies the output current to the output port Vout by using the transistor Q4 and the transistor Q6. Therefore, a quantity of transistors is reduced. In addition, the buck circuit shown in this embodiment may also use a small-capacitance capacitor (for example, a 23 uF capacitor), which may reduce a layout area.

In addition, an embodiment of this application further provides a power management method. The power management method is applied to the power management system in any one of the embodiments corresponding to FIG. 1, FIG. 2, FIG. 5, FIG. 8, and FIG. 11. The power management system includes a DC-DC conversion circuit, an input port, an output port, a first control circuit, and a charging circuit. The input port is configured to receive an input voltage and an input current. The output port is connected to a load, and is configured to supply an output voltage and an output current to the load. The DC-DC conversion circuit is connected between the input port and the output port. The first control circuit is connected between the output port and a control terminal of the charging circuit. The charging circuit is connected between the input port and the output port. The input current may include a first input current and a second input current.

FIG. 13 is a flowchart of a power management method 1300 according to an embodiment of this application. The power management method 1300 specifically includes the following steps.

S1301: The DC-DC conversion circuit is configured to: obtain a first feedback voltage used to reflect the output voltage from the output port, and charge the output port from the input port based on the first feedback voltage and a first reference signal, to adjust the output voltage.

The first reference signal is used to control a currently expected output voltage of the output port, that is, a voltage required by the load to operate. The first reference signal may be the expected output voltage, or may be an adjusted voltage that is adjusted based on the expected output voltage. A second reference signal may change, and the second reference signal changes based on an operating status of the load. The first reference signal may be the reference signal Vset described in the foregoing embodiments.

The first feedback voltage may be an actual output voltage of the output port, or may be a voltage obtained by adjusting the actual output voltage.

S1302: The first control circuit is configured to: obtain a second feedback voltage of the output voltage from the output port, generate a first control signal based on the second feedback voltage and the second reference signal, and supply the first control signal to the charging circuit.

The second feedback voltage may be the actual output voltage of the output port, or may be the voltage obtained by adjusting the actual output voltage.

There may be one or two second reference signals. The second reference signal is used to control the currently expected output voltage of the output port, that is, the voltage required by the load to operate. When there are two second reference signals, values of the two second reference signals are different, and a value of one second reference signal is greater than a value of the other second reference signal. Specifically, the two second reference signals may be, for example, the reference signal VB and the reference signal VT described in the foregoing embodiments. The second reference signal herein may change, and the second reference signal changes based on the operating status of the load.

The first control circuit may be a comparator. For example, the comparator may be a single-limit comparator, or may be a double-limit comparator. When there is one second reference signal, the comparator may be the single-limit comparator. The single-limit comparator generally includes two input terminals, which are respectively configured to input the second reference signal and the second feedback voltage.

When there are two second reference signals, the comparator may be the double-limit comparator. The double-limited comparator is configured to: separately compare the second feedback voltage with the two second reference signals; when detecting that the second feedback voltage is less than the second reference signal with a lower value, control at least some transistors in a charging subcircuit to be turned on, convert the input current into a second output current in time, and supply the second output current to the output port, to supplementally adjust the output voltage; and when detecting a voltage value of the output port is greater than the second reference signal with a higher value, control at least some transistors in the charging circuit to be turned off, so as to stop generating the second output current.

Further, the double-limit comparator may be a hysteresis comparator. The hysteresis comparator may be the hysteresis comparator B shown in any one of FIG. 2, FIG. 4A, FIG. 4B, FIG. 5, FIG. 8, and FIG. 11.

S1303: The charging circuit receives the first control signal, and charges the output port from the input port based on the first control signal, to supplementally adjust the output voltage.

The charging circuit herein may be a charging subcircuit (not shown in the figure) in the charging circuit 02 shown in FIG. 1, that is, may be a circuit other than the hysteresis comparator B in the charging circuit 02 shown in any one of the embodiments shown in FIG. 2 and FIG. 5, or may include a circuit including the transistor Q4, the transistor Q5, and the inductor L1 in the embodiment shown in FIG. 8, or may include a circuit including the transistor Q4, the transistor Q5, the inductor L1, the transistor Q6, the transistor Q7, and the inductor L2 in the embodiment shown in FIG. 11.

Specifically, the charging circuit includes a third transistor. When the third transistor is turned on, a current channel may be formed. Under control of a control signal output by the first control circuit, when the third transistor is turned on, the input current received by the input port may be supplied to the output port, to generate the second output current, so as to supplementally adjust the voltage of the output port. When the third transistor is turned off, generation of the second output current is stopped.

In a possible design, the charging circuit further includes a fourth transistor and a capacitor. The first control circuit may control the third transistor to be turned off and the fourth transistor to be turned on. In this case, the input current received by the input port is supplied to the capacitor to charge the capacitor. Alternatively, the first control circuit may control the third transistor to be turned on and the fourth transistor to be turned off. The capacitor is discharged through the third transistor to form a channel from the capacitor to the output port. In this case, the second output current is supplied to the output port.

In a possible design, the DC-DC conversion circuit may include a second control circuit and a power stage circuit. Specifically, the second control circuit may be the buck control circuit shown in any one of FIG. 2, FIG. 3, FIG. 5, FIG. 8, FIG. 9, FIG. 11, and FIG. 12. The power stage circuit may be the buck circuit (for example, a circuit including the transistor Q1, the transistor Q2, the inductor L0, and the capacitor C1 shown in FIG. 2, FIG. 5, FIG. 8, and FIG. 11) shown in FIG. 2, FIG. 5, FIG. 8, and FIG. 11.

The second control circuit is configured to obtain the first feedback voltage used to reflect the output voltage from the output port, and generate at least one second control signal based on the first feedback voltage and the first reference signal. Each of at least one first power stage circuits includes a first transistor, a second transistor, and a first inductor. A first terminal of the first transistor is connected to the input port. A second terminal of the first transistor is connected to a first terminal of the second transistor. A second terminal of the second transistor is connected to a common ground. One terminal of the first inductor is connected to the second terminal of the first transistor. The other terminal of the first inductor is connected to the output port. The first transistor (for example, Q1, Q4, or Q6) is configured to charge: based on a second control signal that corresponds to the first power stage circuit among the at least one second control signals, the output port from the input port by using the first inductor. The second transistor (for example, Q2, Q5, or Q7) is configured to charge: based on the second control signal that corresponds to the first power stage circuit, the output port by using the first inductor.

In a possible design, a first transistor in a second power stage circuit in the at least one first power stage circuits is shared by the second power stage circuit and the charging circuit. The first transistor (for example, Q1, Q4, or Q6) in the second power stage circuit is specifically configured to charge: based on the first control signal and a second control signal that corresponds to the second power stage circuit, the output port from the input port by using the inductor.

In a possible design, the second control circuit is further configured to: obtain the first control signal generated by the first control circuit, and generate a third control signal based on the first control signal and the second control signal that corresponds to the second power stage circuit. The first transistor (for example, Q1, Q4, or Q6) in the second power stage circuit is specifically configured to charge: based on the third control signal, the output port from the input port by using the inductor.

In a possible design, the power management system further includes a reference signal adjustment circuit. An input terminal of the reference signal adjustment circuit is connected to an output terminal of the first control circuit. An output terminal of the reference signal adjustment circuit is connected to one input terminal of the DC-DC conversion circuit. The reference signal adjustment circuit is configured to: adjust a value of the first reference signal based on the control signal output by the first control circuit, and supply the adjusted first reference signal to the DC-DC conversion circuit. For a specific structure and method implementation of the reference signal adjustment circuit, refer to the related descriptions in the embodiment corresponding to FIG. 6.

Figure 14:
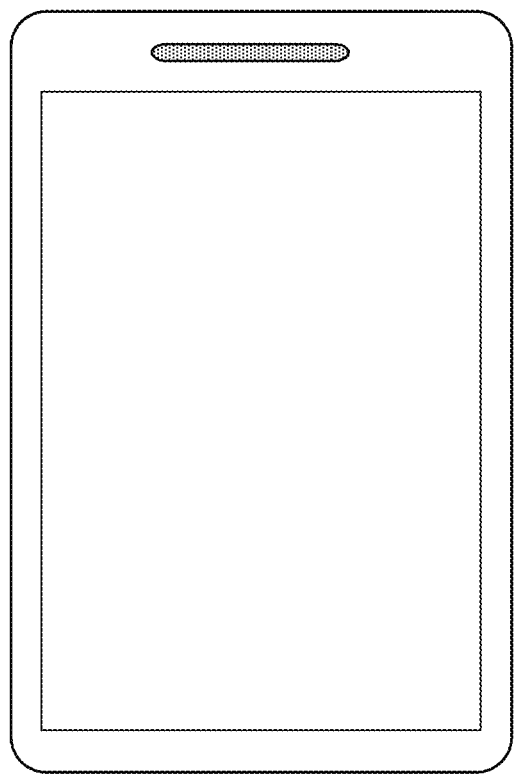
FIG. 14 is a schematic diagram of a structure of an electronic device according to an embodiment of this application.

An embodiment of this application further provides an electronic device. FIG. 14 shows a schematic diagram of a structure of an electronic device according to an embodiment of this application. The electronic device 1400 may be a portable computer (for example, a mobile phone), a notebook computer, a wearable electronic device (for example, a smartwatch), a tablet computer, an augmented reality (AR) device, a virtual reality (VR) device, a vehicle-mounted device, or the like. Specifically, the electronic device shown in this application includes the power management system in any one of the embodiments in FIG. 1, FIG. 2, FIG. 5, FIG. 8, and FIG. 11. The electronic device may further include a power supply component such as a battery. The power management system may supply, to a load, electric energy supplied by the power supply component such as the battery, to supply the load with the electric energy required for operating.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

The invention claimed is:
1. A power management system comprising:
a direct current-direct current (DC-DC) conversion circuit, a first control circuit, a charging circuit, an input port, and an output port, wherein
the input port is configured to receive an input voltage;
the output port is connectable to a load, and is configured to supply an output voltage to the load;
the DC-DC conversion circuit is connected between the input port and the output port, and is configured to obtain a first feedback voltage used to reflect the output voltage from the output port, and charge the output port from the input port based on the first feedback voltage and a first reference signal, to adjust the output voltage;
the first control circuit is connected between the output port and the charging circuit, and is configured to obtain a second feedback voltage of the output voltage from the output port, generate a first control signal based on the second feedback voltage and a second reference signal, and supply the first control signal to the charging circuit;
the charging circuit is connected between the input port and the output port, and is configured to charge the output port from the input port based on the first control signal, to supplementally adjust the output voltage;
wherein the DC-DC conversion circuit comprises a second control circuit and at least one first power stage circuit, wherein
the second control circuit is configured to obtain the first feedback voltage used to reflect the output voltage from the output port, and generate at least one second control signal based on the first feedback voltage and the first reference signal;

each of the at least one first power stage circuit comprises a first transistor, a second transistor, and an inductor, wherein a first terminal of the first transistor is connected to the input port, a second terminal of the first transistor is connected to a first terminal of the second transistor, a second terminal of the second transistor is connected to a common ground, one terminal of the inductor is connected to the second terminal of the first transistor, and the other terminal of the inductor is connected to the output port;

the first transistor is configured to charge, based on a second control signal that corresponds to the first power stage circuit among the at least one second control signals, the output port from the input port by using the inductor; and the second transistor is configured to charge, based on the second control signal, the output port by using the inductor;

wherein a first transistor in a second power stage circuit in the at least one first power stage circuit is shared by the second power stage circuit and the charging circuit; and the first transistor in the second power stage circuit is configured to charge, based on the first control signal and a second control signal, the output port from the input port by using the inductor.

2. The power management system according to claim 1, wherein the first control circuit comprises a comparator, configured to compare the second feedback voltage with the second reference signal to obtain the first control signal.

3. The power management system according to claim 2, wherein the comparator is a hysteresis comparator.

4. The power management system according to claim 3, wherein the second reference signal comprises a plurality of threshold signals used for hysteresis comparison by the hysteresis comparator.

5. The power management system according to claim 1, wherein the charging circuit comprises a third transistor; and
a control terminal of the third transistor is configured to receive the first control signal, a first terminal of the third transistor is connected to the input port, a second terminal of the third transistor is connected to the output port, and the third transistor is configured to charge the output port from the input port based on the first control signal.

6. The power management system according to claim 1, wherein the charging circuit comprises a third transistor, a fourth transistor, and a capacitor;
a control terminal of the third transistor and a control terminal of the fourth transistor are separately configured to receive the first control signal, a first terminal of the third transistor is connected to a second terminal of the fourth transistor, a second terminal of the third transistor is connected to the output port, and a first terminal of the fourth transistor is connected to the input port;
a first electrode of the capacitor is connected to the first terminal of the third first transistor, and a second electrode of the capacitor is connected to the common ground;
the fourth transistor is configured to charge the capacitor from the input port based on the first control signal; and
the third transistor is configured to charge the output port from the capacitor based on the first control signal.

7. The power management system according to claim 1, wherein the second control circuit is further configured to obtain the first control signal, and generate a third control signal based on the first control signal and the second control signal; and
the first transistor in the second power stage circuit is configured to charge, based on the third control signal, the output port from the input port by using the inductor.

8. The power management system according to claim 1, wherein the second control circuit comprises an error amplifier, a signal modulator, and at least one driver;
the error amplifier is configured to amplify an error between the first feedback voltage and the first reference signal to obtain an amplified signal;
the signal modulator is configured to receive the amplified signal and generate at least one modulated signal; and
each of the at least one driver is configured to receive the modulated signal and generate one of the at least one second control signals.

9. The power management system according to claim 1, wherein the power management system further comprises a reference signal adjustment circuit, connected between the first control circuit and the DC-DC conversion circuit; and
the reference signal adjustment circuit is configured to adjust a value of the first reference signal based on the first control signal, and supply an adjusted first reference signal to the DC-DC conversion circuit.

10. An electronic device comprising:
a power management system comprising a direct current-direct current (DC-DC) conversion circuit, a first control circuit, a charging circuit, an input port, and an output port, wherein
the input port is configured to receive an input voltage;
the output port is connectable to a load, and is configured to supply an output voltage to the load;
the DC-DC conversion circuit is connected between the input port and the output port, and is configured to obtain a first feedback voltage used to reflect the output voltage from the output port, and charge the output port from the input port based on the first feedback voltage and a first reference signal, to adjust the output voltage;
the first control circuit is connected between the output port and the charging circuit, and is configured to obtain a second feedback voltage of the output voltage from the output port, generate a first control signal based on the second feedback voltage and a second reference signal, and supply the first control signal to the charging circuit;
the charging circuit is connected between the input port and the output port, and is configured to charge the output port from the input port based on the first control signal, to supplementally adjust the output voltage;
wherein the DC-DC conversion circuit comprises a second control circuit and at least one first power stage circuit, wherein
the second control circuit is configured to obtain the first feedback voltage used to reflect the output voltage from the output port, and generate at least one second control signal based on the first feedback voltage and the first reference signal;
each of the at least one first power stage circuit comprises a first transistor, a second transistor, and an inductor, wherein a first terminal of the first transistor is connected to the input port, a second terminal of the first transistor is connected to a first terminal of the second transistor, a second terminal of the second transistor is connected to a common ground, one terminal of the inductor is connected to the second terminal of the first transistor, and the other terminal of the inductor is connected to the output port;

the first transistor is configured to charge, based on a second control signal that corresponds to the first power stage circuit among the at least one second control signals, the output port from the input port by using the inductor; and the second transistor is configured to charge, based on the second control signal, the output port by using the inductor;

wherein a first transistor in a second power stage circuit in the at least one first power stage circuit is shared by the second power stage circuit and the charging circuit; and the first transistor in the second power stage circuit is configured to charge, based on the first control signal and a second control signal, the output port from the input port by using the inductor.

11. The electronic device according to claim 10, wherein the first control circuit comprises a comparator, configured to compare the second feedback voltage with the second reference signal to obtain the first control signal.

12. The electronic device according to claim 11, wherein the comparator is a hysteresis comparator.

13. The electronic device according to claim 12, wherein the second reference signal comprises a plurality of threshold signals used for hysteresis comparison by the hysteresis comparator.

14. The electronic device according to claim 10, wherein the charging circuit comprises a third transistor; and a control terminal of the third transistor is configured to receive the first control signal, a first terminal of the third transistor is connected to the input port, a second terminal of the third transistor is connected to the output port, and the third transistor is configured to charge the output port from the input port based on the first control signal.

15. The electronic device according to claim 10, wherein the charging circuit comprises a third transistor, a fourth transistor, and a capacitor;

a control terminal of the third transistor and a control terminal of the fourth transistor are separately configured to receive the first control signal, a first terminal of the third transistor is connected to a fourth terminal of the second transistor, a second terminal of the third transistor is connected to the output port, and a first terminal of the fourth transistor is connected to the input port;

a first electrode of the capacitor is connected to the first terminal of the third transistor, and a second electrode of the capacitor is connected to the common ground;

the fourth transistor is configured to charge the capacitor from the input port based on the first control signal; and the third transistor is configured to charge the output port from the capacitor based on the first control signal.

16. The electronic device according to claim 10, wherein the second control circuit comprises an error amplifier, a signal modulator, and at least one driver;

the error amplifier is configured to amplify an error between the first feedback voltage and the first reference signal to obtain an amplified signal;

the signal modulator is configured to receive the amplified signal and generate at least one modulated signal; and each of the at least one driver is configured to receive the modulated signal and generate one of the at least one second control signals.

17. The electronic device according to claim 10, wherein the second control circuit is further configured to obtain the first control signal, and generate a third control signal based on the first control signal and the second control signal; and the first transistor in the second power stage circuit is configured to charge, based on the third control signal, the output port from the input port by using the inductor.

* * * * *

UNITED STATES PATENT AND TRADEMARK OFFICE
CERTIFICATE OF CORRECTION

| | | |
|---|---|---|
| PATENT NO. | : 12,170,479 B2 | Page 1 of 1 |
| APPLICATION NO. | : 17/951469 | |
| DATED | : December 17, 2024 | |
| INVENTOR(S) | : Tuanbao Fan et al. | |

It is certified that error appears in the above-identified patent and that said Letters Patent is hereby corrected as shown below:

In the Claims

In Column 27, Claim 6, Line 61, delete "third first" and insert -- third --, therefor.

Signed and Sealed this
Fourth Day of February, 2025

Coke Morgan Stewart
*Acting Director of the United States Patent and Trademark Office*